(12) United States Patent
Klein et al.

(10) Patent No.: US 10,684,764 B2
(45) Date of Patent: Jun. 16, 2020

(54) FACILITATING MOVEMENT OF OBJECTS USING SEMANTIC ANALYSIS AND TARGET IDENTIFIERS

(71) Applicant: Microsoft Technology Licensing, LLC, Redmond, WA (US)

(72) Inventors: Christian Klein, Duvall, WA (US); Gyancarlo Garcia Avila, Seattle, WA (US); Jesse Matthew Liston, Bellevue, WA (US); Sophors Khut, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 15/939,149

(22) Filed: Mar. 28, 2018

(65) Prior Publication Data

US 2019/0302979 A1 Oct. 3, 2019

(51) Int. Cl.
*G06F 3/048* (2013.01)
*G06F 3/0486* (2013.01)
(Continued)

(52) U.S. Cl.
CPC .......... *G06F 3/0486* (2013.01); *G06F 3/0488* (2013.01); *G06F 3/04817* (2013.01);
(Continued)

(58) Field of Classification Search
CPC . G06F 3/0486; G06F 3/26; G06F 3/90; G06F 17/2785; G06F 17/289
See application file for complete search history.

(56) References Cited

U.S. PATENT DOCUMENTS

| 5,909,678 A | 6/1999 | Bergman et al. |
| 2004/0056896 A1 | 3/2004 | Doblmayr et al. |

(Continued)

FOREIGN PATENT DOCUMENTS

EP 3260967 A1 12/2017

OTHER PUBLICATIONS

Baudisch, et al., "Drag-and-Pop and Drag-and-Pick: Techniques for Accessing Remote Screen Content on Touch- and Pen-Operated Systems," in Proceedings of the International Conference on Human-Computer Interaction, 2003, 8 pages.

(Continued)

*Primary Examiner* — Claudia Dragoescu

(57) ABSTRACT

A technique is described herein for helping a user move a source object that appears on a user interface presentation to a target destination. The technique involves performing semantic analysis on both the source object and at least one candidate target destination. The semantic analysis yields a score that reflects the relationship between the source object and the candidate target destination. The technique then presents a representation of the candidate target destination that is visually enhanced to an extent that is dependent on its output score. The technique then allows the user to move the source object to a representation of a selected target destination, whereupon it becomes associated with the target destination. The technique can produce the enhanced representation by changing a characteristic of an on-screen target identifier (that already exists on the user interface presentation), or by displaying a transient target identifier.

20 Claims, 14 Drawing Sheets

(51) Int. Cl.
  *G06F 3/0481*   (2013.01)
  *G06F 3/0484*   (2013.01)
  *G06F 3/0488*   (2013.01)
  *G06F 40/30*    (2020.01)
  *G06F 40/56*    (2020.01)
  *G06F 40/216*   (2020.01)

(52) U.S. Cl.
  CPC ...... *G06F 3/04842* (2013.01); *G06F 3/04845* (2013.01); *G06F 40/216* (2020.01); *G06F 40/30* (2020.01); *G06F 40/56* (2020.01)

(56) References Cited

U.S. PATENT DOCUMENTS

| | | | | |
|---|---|---|---|---|
| 2006/0036568 | A1* | 2/2006 | Moore | G06F 16/168 |
| 2006/0218506 | A1* | 9/2006 | Srenger | G06F 9/453 |
| | | | | 715/810 |
| 2008/0295012 | A1* | 11/2008 | Sloo | G06F 3/0486 |
| | | | | 715/769 |
| 2009/0276701 | A1* | 11/2009 | Nurmi | G06F 3/0238 |
| | | | | 715/702 |
| 2011/0252372 | A1* | 10/2011 | Chaudhri | G06F 3/04817 |
| | | | | 715/835 |
| 2015/0074027 | A1* | 3/2015 | Huang | G06N 3/0454 |
| | | | | 706/25 |
| 2015/0193111 | A1* | 7/2015 | Kauffmann | G06F 3/017 |
| | | | | 715/825 |
| 2017/0324841 | A1 | 11/2017 | Clement et al. | |

OTHER PUBLICATIONS

Jul, Susanne, "Predictive Targeted Movement in Electronic Spaces," in CHI '02 Extended Abstracts on Human Factors in Computing Systems, 2002, 2 pages.

Published Search Report and Written Opinion in PCT Application No. PCT/US2019/023486, dated Jul. 2, 2019, 18 pages.

Pham, Hubert, "User Interface Handles for Web Objects," available at http://people.csail.mit.edu/hubert/thesis/hubert-phd-thesis.pdf, doctoral thesis, Massachusetts Institute of Technology, Sep. 2013, 158 pages.

* cited by examiner

Configure the MMC — 1002

Sources
- ☑ Local
- ☑ My Cloud
- ☐ Wife
- ☐ Office

Targets
- ☑ Local
- ☑ My Cloud
- ☐ Wife
- ☐ Office

Content
- ☑ Personal
- ☐ Work

Identifier selection
- ☑ On-screen target identifiers
- ☑ Transient target identifiers

On-screen target identifier behavior
- ☑ Upon delay of [ 5 ] seconds
- ☑ Enlarge
- ☑ Glow effect
. . .

Transient target identifier behavior
- ☑ Upon delay of [ 5 ] seconds
- ☑ Show only identifier
- ☐ Show page of UI upon hold
- ☐ Group related pages of UI

CONTINUED FROM BLOCK 1214 OF FIG. 12

RECEIVE AN INSTRUCTION FROM THE USER TO MOVE THE SOURCE OBJECT TO A REPRESENTATION OF A SELECTED TARGET DESTINATION
1216

MOVE THE SOURCE OBJECT ON THE USER INTERFACE PRESENTATION TO THE REPRESENTATION OF THE SELECTED TARGET DESTINATION, WHICH CAUSES THE SOURCE OBJECT TO BECOME ASSOCIATED WITH THE SELECTED TARGET DESTINATION
1218

FACILITATING MOVEMENT OF OBJECTS USING SEMANTIC ANALYSIS AND TARGET IDENTIFIERS

BACKGROUND

In recent years, manufacturers have increased the power and versatility of smaller-sized computing devices, such as smartphones, tablet-type computing devices, etc. But interaction with these kinds of devices sometimes poses challenges. For instance, consider the case in which a user wishes to move an object from a first application to a second application. The computing device may have a small-sized screen which makes it impracticable or impossible to simultaneously present application windows associated with both the first and second applications. Instead, users typically transfer an object by performing a multi-step process that leverages the operating system's clipboard store. In that process, the user: (1) activates the first application; (2) selects the desired object and stores it in the clipboard store; (3) activates the second application; and (4) pastes the object into the second application at a desired location. While this solution achieves the desired result, it is nonetheless cumbersome and inefficient.

SUMMARY

According to one illustrative implementation, a technique is described herein for helping a user move a source object that appears on a user interface presentation to a target destination. The technique involves performing semantic analysis on both the source object and at least one candidate target destination. The semantic analysis yields a score that reflects a strength of a relationship between the source object and the candidate target destination. The technique then presents a representation of the candidate target destination that is enhanced to an extent that is dependent on its output score. The technique then allows the user to move the source object to a representation of some selected target destination, such as the abovementioned representation of the candidate target destination, whereupon the source object becomes associated with the candidate target destination.

According to one illustrative aspect, the semantic analysis can take into account a plurality of features pertaining to the source object and the candidate target destination, including content-based features, user history-related features, object history-related features, etc.

According to another illustrative aspect, the semantic analysis can use a machine-trained model.

According to one mode of operation, a target identifier associated with the candidate target destination already appears on the user interface presentation prior to the user beginning to move the source object. This kind of target identifier is referred to herein as an on-screen target identifier. In this case, the technique provides an enhanced representation of the candidate target destination by changing at least one characteristic of the on-screen target identifier, such as by enlarging the target identifier, making it glow, etc. According to another mode of operation, the technique provides an enhanced representation of the candidate target destination by showing a transient target identifier (which did not appear on the user interface presentation at the time that the user began the movement operation).

The technique has various technical advantages. For instance, the technique allows a user to efficiently move a source object to a target destination, e.g., by reducing the number of steps that the user is required to perform to accomplish this goal. This is particularly beneficial for devices having small displays, but the technique improves efficiency when applied to any display device having any size.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10 shows one implementation of a configuration user interface presentation that the MMC may use to configure the operation of the MMC.

Figure 1:
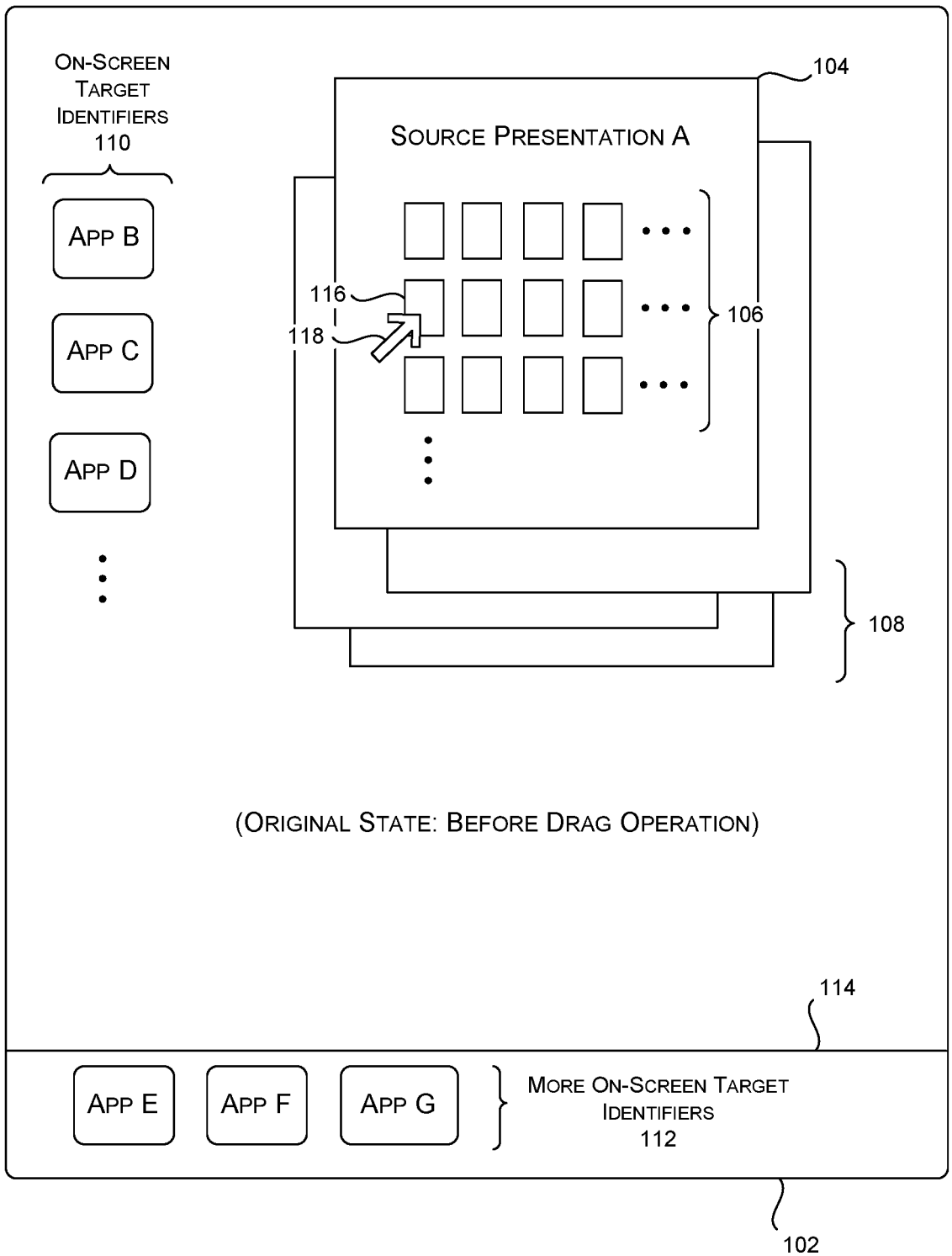
FIG. 1 shows an illustrative user interface presentation including a source object that the user intends to move to a target destination, prior to the user moving that source object.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing system for helping a user move a source object to a target destination in an efficient manner. Section B sets forth illustrative methods which explain the operation of the computing system of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The terms "component," "unit," "element," etc. refer to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuity of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing System

A.1. Illustrative User Interface Experience

This subsection describes illustrative user interface presentations provided by a computing device. The computing device displays the user interface presentations on a display device having any size. In one implementation, an operating system of the computing device implements a movement management component (MMC). The MMC is the logic which, at least in part, generates the user interface presentations described below. The next subsection (Subsection A.2) describes one illustrative implementation of the MMC itself.

Starting with FIG. 1, this figure shows a user interface presentation 102 that generally corresponds to a desktop-type presentation. The user interface presentation 102 includes a source presentation A 104 produced by an application A. The source presentation A 104 is associated with one or more movable objects 106. For example, the application A may correspond to a photo-sharing application that includes one or more pages of digital photographs. Each digital photograph corresponds to a movable object. In another example, the application A corresponds to a word processing application that provides one or more documents. Each document may correspond to a movable object. In addition, each part of an individual document (such as each page, paragraph, sentence, word, letter, etc.) may correspond to a movable object. More generally, a movable object can include content of any type (or combination of types), having any scope.

The user interface presentation 102 may also include zero, one, or more other presentations 108 provided by other respective applications. In the state shown in FIG. 1, the application A corresponds to the in-focus application with which the user is currently interacting. Hence, the user interface presentation 102 shows that the source presentation A 104 as overlaid on top of the other presentations 108. (Subsequent figures will omit a depiction of the other presentations 108 to facilitate explanation.)

The user interface presentation 102 may optionally include one or more on-screen target identifiers 110 in a main section of the user interface presentation 102. In addition, or alternatively, the user interface presentation 102 can include one or more on-screen target identifiers 112 in a taskbar region 114 of the user interface presentation 102. Each of the on-screen target identifiers represents a candidate target destination. For example, the on-screen target identifiers (110, 112) shown in FIG. 1 represent respective applications. Alternatively, or in addition, the target identifiers may represent other resources, such as folders, remote storage sites, people, etc. The qualifier "on-screen" means that each target identifier has a stable on-screen presence on the user interface presentation 102. For instance, each on-screen target identifier may correspond to an icon having a persistent presence on the user interface presence 102, that is, unless explicitly removed by the user.

In the above setting, assume that the user intends to move a source object 116 from a source domain presented on the user interface presentation 102 to an appropriate target destination, such a particular application, folder, repository, person, etc. In the particular example of FIG. 1, the source object 116 corresponds to a digital photograph, and the source domain corresponds to the source presentation A 104. In other cases, the source domain may correspond to a desktop application itself.

The user commences the movement operation by selecting the source object 116 and dragging it across the user interface presentation 102. In the merely illustrative case of FIG. 1, the user performs the drag operation using a mouse device (not shown). A user controls a cursor 118 using the mouse device. In other implementations, the computing device displays the user interface presentation 102 on a touch-sensitive display device. The touch-sensitive display device includes a touch-sensitive surface implemented using capacitive technology, resistive technology, optical technology, etc., or any combination thereof. In that context, the user may perform the drag operation using a finger (or fingers), a pen, a stylus, etc. applied to the touch-sensitive surface of the display device. Note that this explanation sets forth various mouse-based user interface operations; any such example should be construed as having a counterpart touch-based drag operation, although not explicitly stated in each instance.

In some cases, the user commences the drag operation with a target destination already in mind. The user interface presentation 102 may already show a target identifier associated with the intended target destination, e.g., corresponding to one of the on-screen target identifiers (110, 112). Alternatively, at the start of the drag operation, the user interface presentation 102 may not display a target identifier associated with the intended target destination. In still other cases, the user may begin the drag operation without having decided where to place the source object 116.

In response to the user's movement of the source object 116, the MMC will determine the relationship between the source object and each of a plurality of candidate target destinations, including target destinations that currently have respective on-screen target identifiers and target destinations that do not currently have any on-screen target identifiers. This yields an output score for each candidate destination. Subsection A.2 explains one technique for performing this assessment.

The MMC then enhances each target identifier based on its corresponding target destination's output score. For instance, the MMC can determine whether a target destination's output score is above a prescribed threshold value. If so, the MMC can enhance its corresponding target identifier to an extent that is dependent on the magnitude of the output score. This enhancement can involve modifying an on-screen target identifier that already appears on the user interface presentation 102. In other cases, this enhancement involves displaying a transient target identifier associated with the candidate target destination.

The user may configure the MMC to identify when the above-summarized processing will commence. In one case, the MMC can be configured to begin the above processing immediately after the user begins moving the source object 116. In another case, the MMC can be configured to begin the above processing when the user explicitly requests it, e.g., by issuing a voice command to "show recommended targets." In another case, the MMC can be configured to commence the processing when the user presses down on the source object 116 (with a finger, pen, etc.) for more than a prescribed amount of time, or when the user performs a similar hold gesture. In still another case, the MMC can be configured to begin the above processing when the user fails to move the source object 116 to a target destination in a prescribed amount of time, suggesting that the user is having difficulty selecting a desired target destination.

Figure 2:
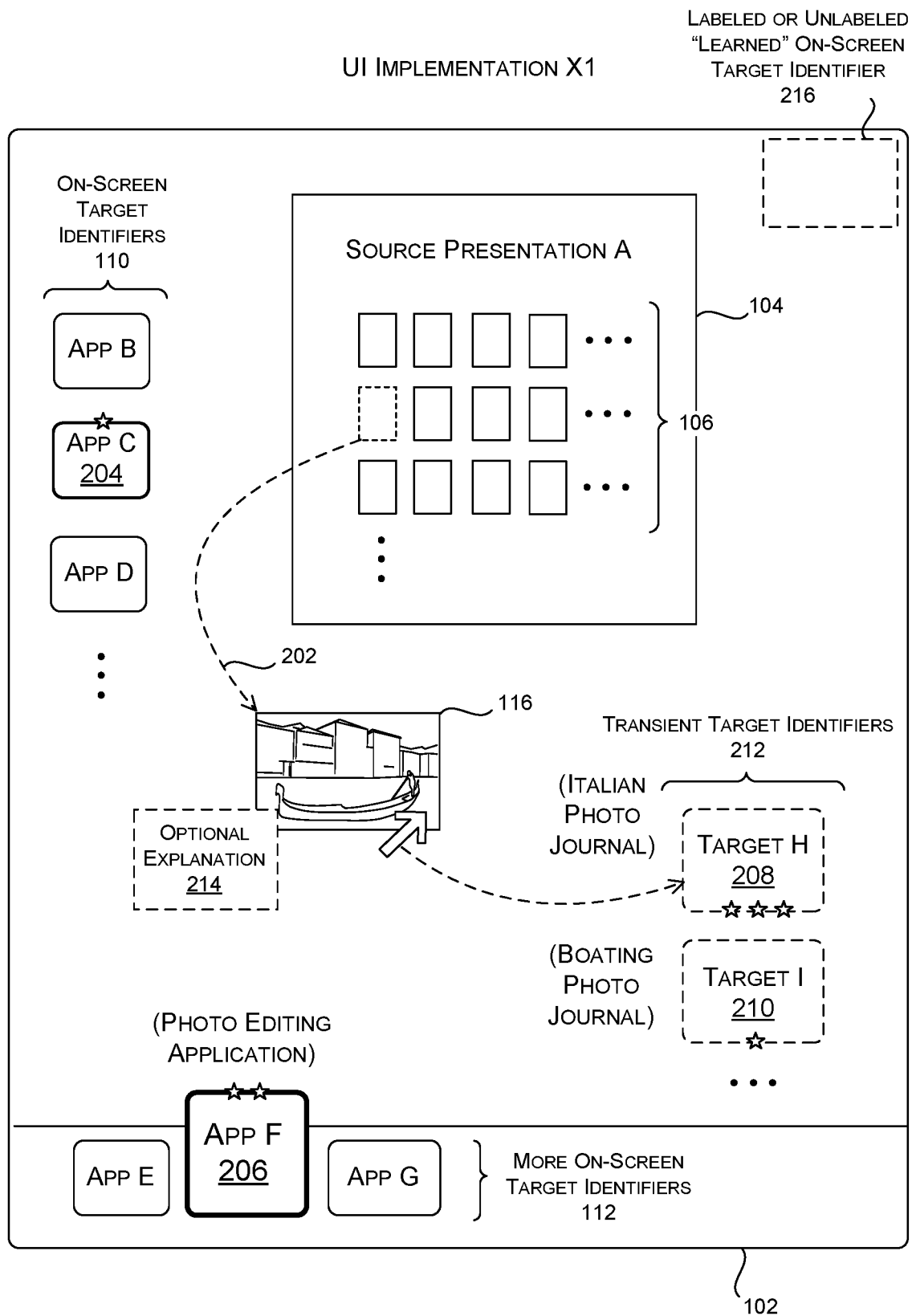
FIG. 2 shows an illustrative user interface presentation that a movement management component (MMC) produces when the user begins to move the source object, per a first implementation.

FIG. 2 shows an illustrative appearance of the user interface presentation 102 after the above-described processing has been invoked. In this example, the user has selected the source object 116 (corresponding to a digital photograph of Venice, Italy) within the set of objects 106 in the source presentation A 104, e.g., by clicking-and-holding on the source object 116 with a mouse device, or by touching it; thereafter the user moves the source object 116 away from the set of objects 106. Depending on how the drag operation is configured, this operation may result in removing the source object 116 from the collection of objects 106; or it may involve creating a copy of the source object 116, leaving the original source object 116 in place in the source presentation A 104. In the juncture depicted by FIG. 2, the user has dragged the source object 116 over a path 202. At this juncture, however, the user has not yet moved the source object 116 to its final target destination.

The MMC produces enhanced representations of four target identifiers in response to its processing. The first two target identifiers (204, 206) correspond to existing on-screen target identifiers, e.g., corresponding to two icons associated with two respective local applications. The other two target identifiers (208, 210) correspond to transient target identifiers that did not appear on the user interface presentation 102 prior to the user performing the drag operation. More generally, the MMC can present any number of transient target identifiers 212. In the non-limiting example of FIG. 2, the transient target identifiers 212 correspond to target icons of the same style and appearance as the on-screen target identifiers (110, 112).

The MMC can enhance the appearance of a target identifier in one or more ways. Consider the case of any on-screen target identifier. Without limitation, the MMC can: change the size of the target identifier; change the color of the target identifier; change the intensity level of the target identifier; change the transparency level of the target identifier; present the target identifier in a special mode (such a glow mode, a visual vibrate/jitter mode, etc.); add a rating label to the target identifier; change the position of the target identifier on the user interface presentation 102 relative to other target identifiers, and so on.

Consider now the case of a transient target identifier. The MMC can be said to enhance the visual representation of such a transient target identifier by the mere act of displaying it (which inherently emphasizes the transient target identifier with respect to those transient target identifiers which are not displayed because they are not sufficiently relevant to the source object 116). In addition, the MMC can use any technique described above for the on-screen target identifiers to accentuate the relevance of a transient target identifier, e.g., by choosing an appropriate size, position, color, intensity, etc. of the transient target identifier.

In the merely illustrative example of FIG. 2, the MMC highlights the relevance of each of the selected target identifiers (204, 206, 208, 210) using a star rating label. As shown, the transient target identifier H 208 has the most stars, which indicates that the MMC has assessed it as being the most relevant to the source object. In addition, the MMC modifies the intensity levels applied to the on-screen target identifiers (204, 206) based on their respective output score. Note that the on-screen target identifier 206 is shown with a greater intensity level than the on-screen target identifier 204. In addition, the MMC modifies the size of the on-screen target identifier 206.

The MMC may optionally display an explanation 214 which alerts the user to the reasons why it has enhanced the above-noted set of target identifiers (204, 206, 208, 210). The MMC can present this explanation with any level of granularity. For instance, the MMC can inform the user that it has selected the transient target identifier H 208 because the theme of the source object (Venice, Italy) matches the theme of the target destination associated with the target identifier 208 (which, for instance, corresponds to a photo journal of an Italian vacation). The MMC can inform the user that it has selected the on-screen target identifier 206 (which is a photo editing application) because the user often drags digital photographs from the source presentation A 104 as a prelude to operating on the photographs using the photo editing application. The MMC can create explanations in the manner set forth in Subsection A.2.

In a next stage, the user moves the source object 116 to a target destination. The user may perform this task by dragging the source object 116 to any target identifier, including any identifier that the MMC has enhanced, or any identifier the MMC has not enhanced. In the example of FIG. 2, assume that the user drags the source object 116 to the transient target identifier H 208, that is, by colloquially "dropping" the source object 116 onto an icon associated with the transient target identifier H 208. Alternatively, the user may abandon the drag operation, upon which the source object 116 may remain wherever the user left it on the user interface presentation 102. Or the MMC can snap the source object 116 back to its original position in the array of objects 106.

The user's movement operation causes the source object 116 to become associated with the target destination H associated with the transient target identifier H 208. For instance, again assume that the target destination H corresponds to an online photo journal. The user's drag behavior causes the photo journal to store the source object 116 at a default location within the photo journal, such as on a last page of the photo journal.

In one implementation, the MMC removes the transient target identifiers 212 after the user drops the source object 116 onto the transient target identifier H 208. It also removes any enhancement applied to the on-screen target identifiers 110. In another implementation, the MMC removes the transient target identifiers 212 only after receiving the user's explicit instruction to do so. In either case, the target identifiers 212 are said to be "transient" because they are not considered persistent parts of the user interface presentation 102, unlike the on-screen target identifiers (110, 112).

The user interface presentation 102 may optionally present another type of identifier, which may be considered a learned on-screen target identifier. In operation, assume that the user frequently moves source objects to a particular transient target identifier that corresponds to a social media application. On each such prior instance, further assume that the MMC presents a transient target identifier associated with the social media application in the same part of the user interface presentation 102. In the example of FIG. 2, assume that the MMC presents the transient identifier in the upper right corner of the user interface presentation 102. This behavior allows the user to create a mental association between the social media application and the upper right corner of the user interface presentation 102. The MMC determines when the frequency of the above-described behavior exceeds an environment-specific threshold value. When this happens, the MMC can display a now-persistent on-screen target identifier 216 in the upper right corner of the user interface presentation 102, which is associated with the social media application. This on-screen target identifier 216 may be regarded as a learned target identifier because the MMC presents it upon learning the user's pattern of behavior vis-à-vis the social media application. The user may thereafter move a source object to the learned on-screen target identifier 216 in the same manner as any other on-screen target identifier.

In some cases, the MMC can label the learned on-screen target identifier 216; in other cases, the MMC does not display any information that identifies the corner of the user interface presentation 102 as begin associated with the social media application (which is the case in the scenario shown in FIG. 2). In still another case, the MMC can provide a transient label in the corner of the user interface presentation 102 that identifies the social media application when the user moves a source object over it; this MMC behavior confirms to the user that the corner of the user interface presentation 102 remains associated with the social media application. Generally, the use of learned target identifiers is advantageous to the user because it leverages the user's established patterns of drag-related behavior, without necessarily cluttering the user interface presentation 102 with transient target identifiers.

In yet other cases, the user may interact with a configuration component to manually establish a link between a particular part of the user interface presentation 102 and a target destination. The user can also provide a setting that determines whether the identified part of the user interface presentation will include a label or not. When unlabeled, this kind of target identifier may be referred to as a user-defined "invisible" target identifier.

Figure 3:
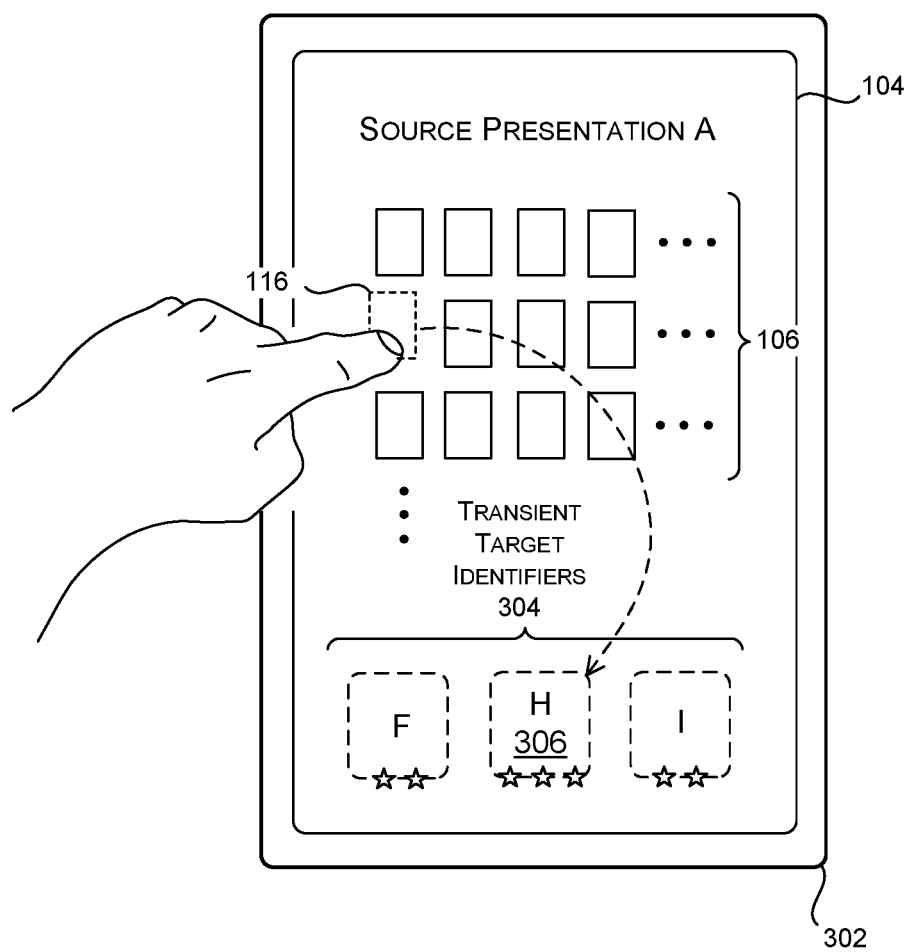
FIG. 3 shows a variation of the user interface presentation shown in FIG. 2, adapted for presentation on a smaller-sized display device compared to the example of FIG. 2.

FIG. 3 shows how the principles set forth in FIG. 2 can be modified for the case of a computing device 302 having a smaller display device compared to the case of FIG. 2. Assume that the display device shown there has a touch-sensitive surface. In the case of FIG. 3, the MMC fills the display space provided by the display device with the source presentation A 104. Again assume that the source presentation A is produced by an application A. It includes a set of movable objects 106. And again assume that the user intends to move a source object 116 to a desired target destination. But in this case, the MMC does not immediately show any on-screen target identifiers.

In operation, the MMC determines that the user has used his or her finger to begin dragging the source object 116. In response, the MMC determines that the most relevant target destinations include target destinations F, H, and I. In response, the MMC displays transient target identifiers 304 for these three target destinations. Assume that the user then drags the source object 116 to the transient target identifier H 306, which causes the source object 116 to be associated with the corresponding target destination H. For instance, the user's gesture causes the source object 116 to be stored on a last page of an online photo journal (which is the target destination associated with the transient target identifier H 306). In the same manner described above for FIG. 2, the MMC may remove the transient target identifiers 304 after the user drops the source object 116 onto the transient target identifier H 306.

Figure 4:
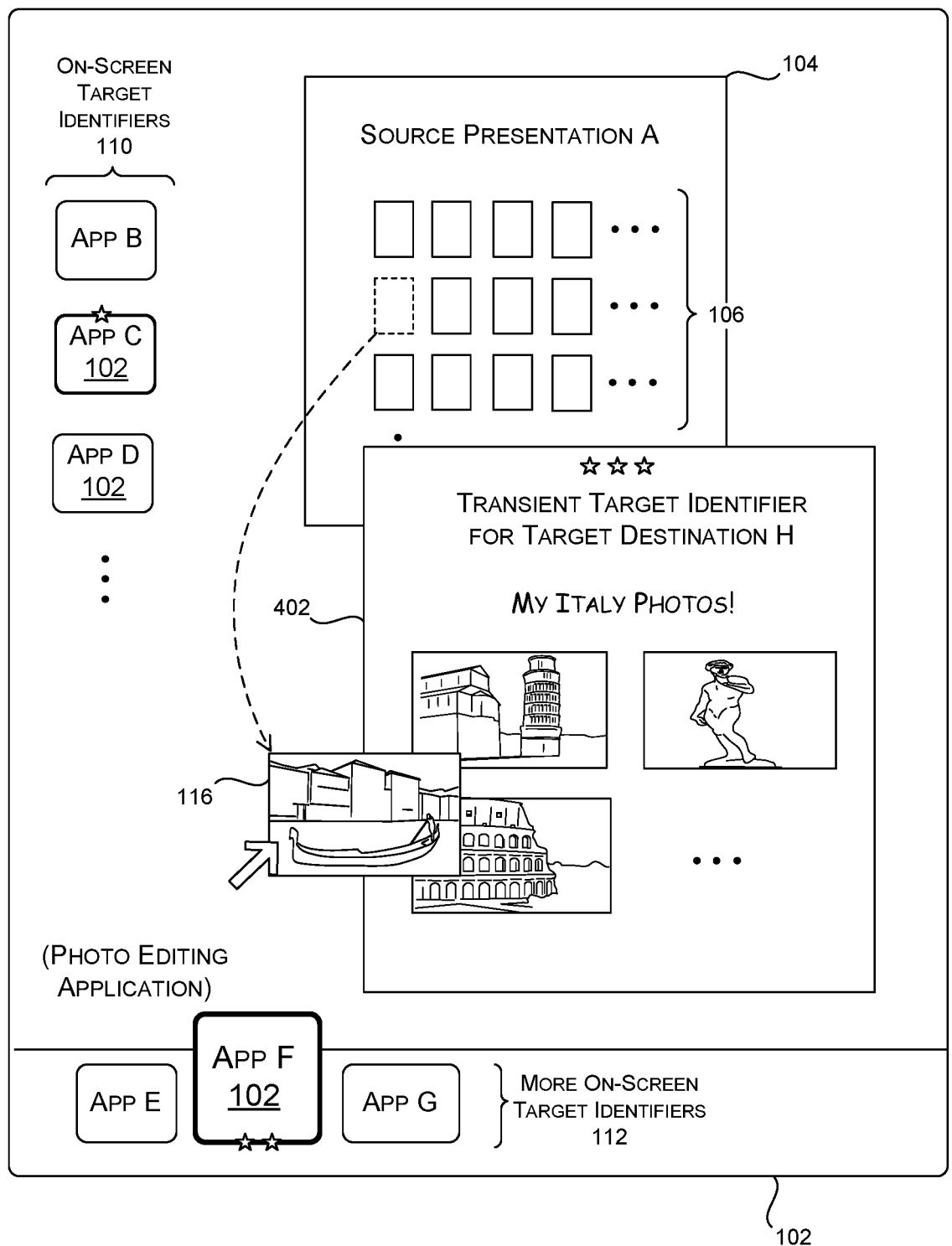
FIG. 4 shows another user interface presentation that the MMC can produce when the user begins to move the source object, according to a second implementation.

FIG. 4 shows a variation of the user interface presentation 102 shown in FIG. 2. In this case, the MMC displays a transient target identifier 402 for the target destination H (corresponding to an online photo journal) that is more detailed compared to the transient target identifier H 208 shown in FIG. 2. That is, in FIG. 2, the transient target identifier H 208 corresponds to just a target icon associated with the target destination H. In FIG. 4, the MMC still displays the transient target identifier 402 when it determines that the user is moving the source object 116. But the transient target identifier 402 in FIG. 4 includes a representation of the content provided by the transient target destination H. For instance, the transient target identifier 402 shows a last page of the online photo journal.

The user may terminate the drag operation by placing the source object 116 at a desired location in the transient target identifier 402. This placement also defines the position of the source object 116 within the counterpart target destination (e.g., by placing the source object 116 at a particular location on the last page of the photo journal). This behavior is different from the example of FIG. 2, in which the MMC places the source object 416 at a default location within the target destination. In one configurable manner of operation, the MMC removes the transient target identifier 402 when the user drops the source object 116 at the chosen location within the transient target identifier 402.

FIG. 4 shows only a single transient target identifier 402. But in other scenarios, the MMC can present plural transient target identifiers of the type shown in FIG. 4. The MMC can arrange these transient target identifiers on the user interface presentation 102 in any manner, such as by showing an array of these identifiers, or by creating a partially overlapping stack of transient target identifiers. The MMC can order the transient target identifiers in the array or stack based on assessed relevance to the source object 116.

Figure 5:
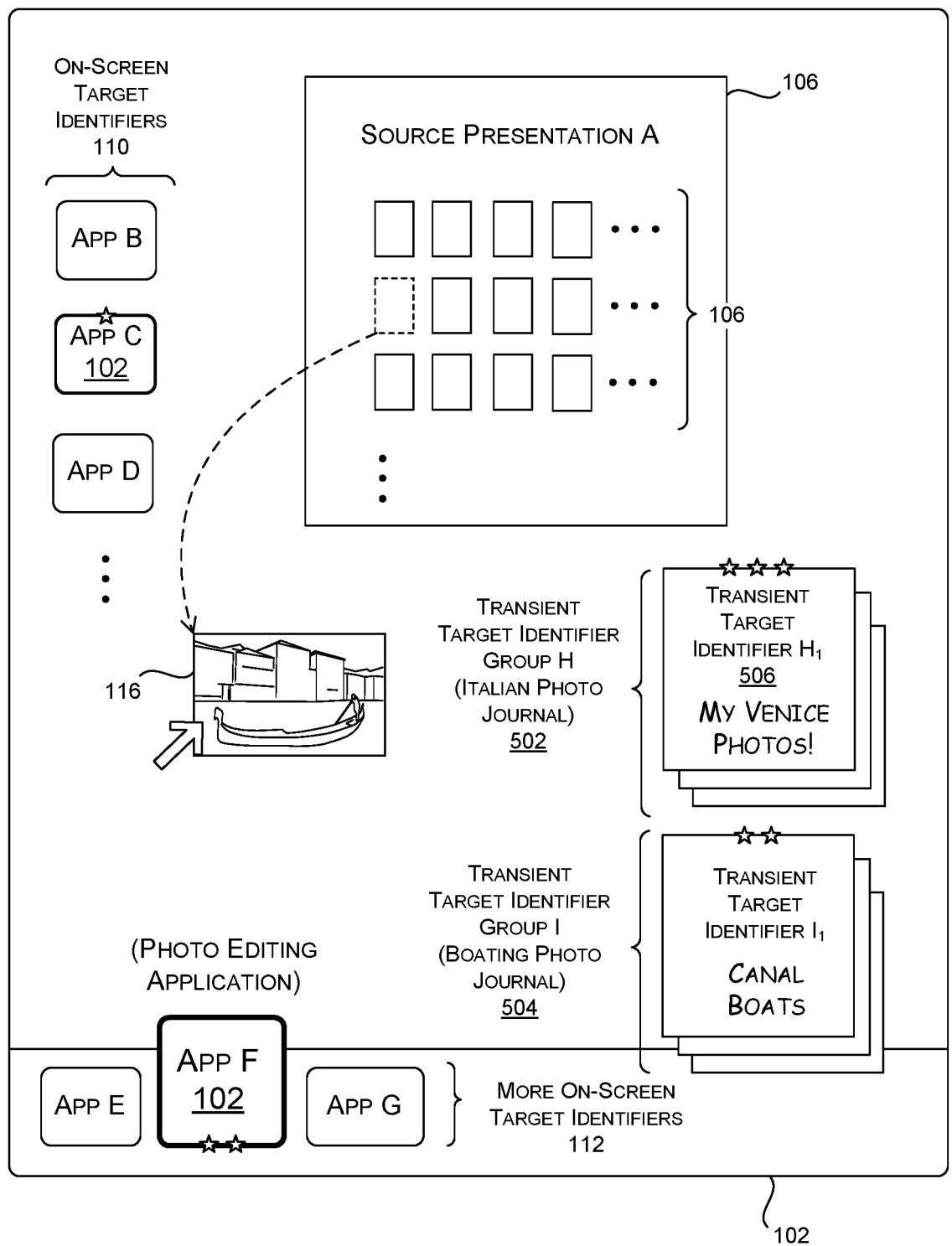
FIG. 5 shows another user interface presentation that the MMC can produce when the user begins to move the source object, per a third implementation.

FIG. 5 shows yet another variation of the user interface presentation 102 depicted in FIG. 2 and in FIG. 4. In this case, assume that at least some of the target destinations include two or more sub-destinations. For example, the online photo journal may encompass plural pages or sections devoted to different subjects. For instance, the user's photo journal of his or her trip to Italy may include plural pages associated with respective visits to Italy's principal cities (e.g., Rome, Venice, Florence, etc.).

In the implementation of FIG. 5, the MMC displays a first group 502 of transient (child) target identifiers associated with target destination H, and a second group 504 of transient (child) target identifiers associated with target destination I. For instance, each group may correspond to a stacked set of partially overlapping target icons associated with the respective target sub-destinations of the main target destination. The MMC can order the transient target identifiers in a group based on their relevance to the source object 116. For instance, the MMC can determine that the target sub-destination for Venice is most relevant to the user's photograph of Venice. The MMC will therefore place the transient target identifier 506 for the Venice page on the top of the stack of transient target identifiers.

Figure 6:
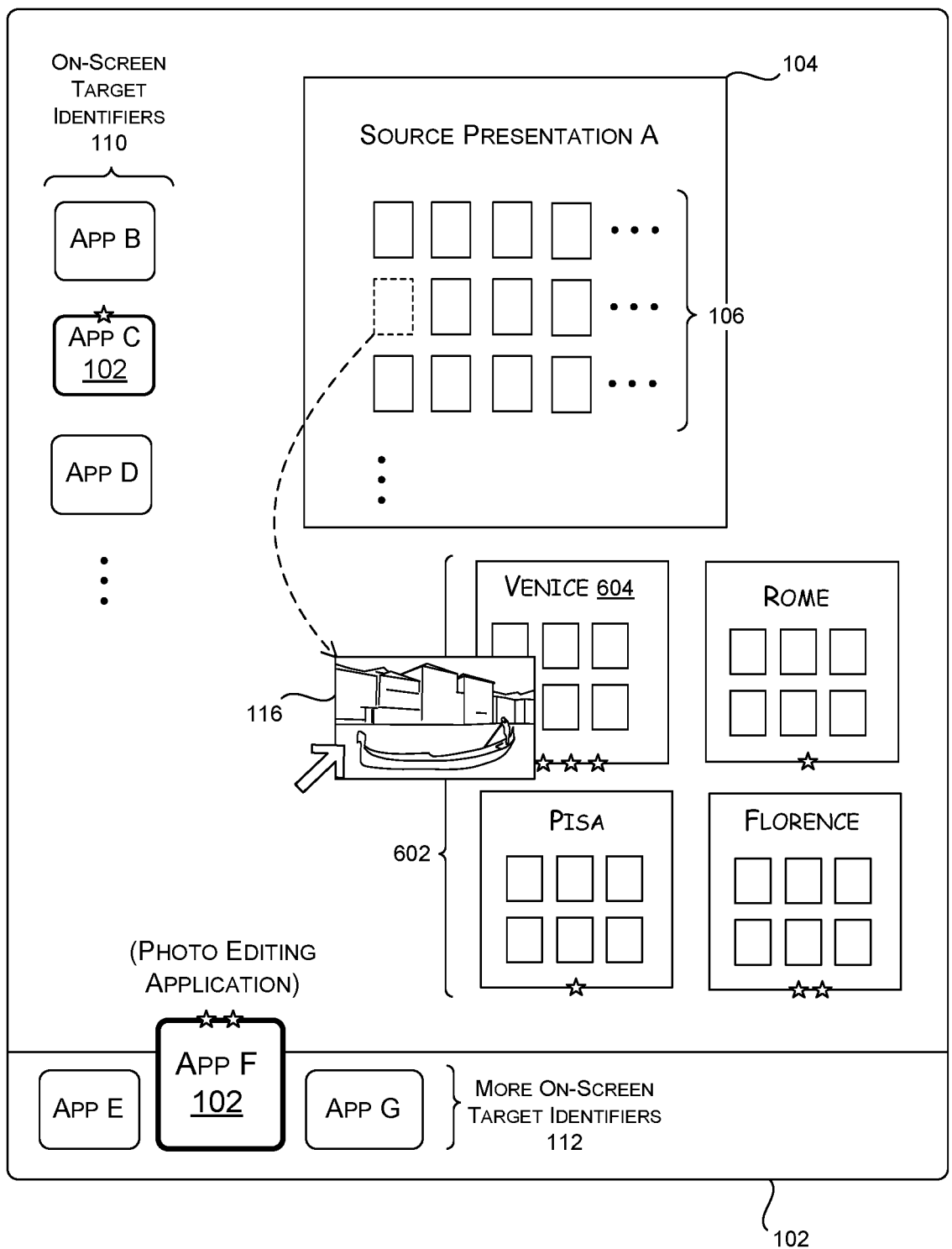
FIG. 6 shows a continuation of the user interface experience shown in FIG. 5.

Advancing to FIG. 6, next assume that the user drags the source object 116 over the transient target identifier 506 for Venice, and then maintains his or her touch (or other kind of contact) at that location for a prescribed amount of time. In response, the MMC can produce the array 602 of expanded transient target identifiers shown in FIG. 6, including an expanded transient target identifier 604 associated with the city of Venice. The user may then drop the source object 116 at a desired location within the transient target identifier 604 (which also places the source object 116 at a corresponding location on the actual Venice page of the photo journal). Note that the MMC can invoke the array 602 of transient target identifiers in response to any other kind of command communicated by the user (besides the above-described press-and-hold gesture), such as a voice command, etc.

The above-described implementations are set forth in the spirit of illustration and not limitation. Still other variations are possible. For example, in another variation, the MMC can allow the user to move a group composed of plural source objects at the same time. In this case, the MMC will determine the relevance of the group of source objects to each candidate target destination. In other words, in this case, a description of the group may correspond to a compendium or aggregation of the attributes of its component sub-objects.

In a variation of the above implementation, assume that a target destination corresponds to a compound destination that represents a group of target destinations. For example, assume that the transient identifier H 208 in FIG. 2 represents an online photo journal, and that the online photo journal encompasses destination pages associated with different Italian cities. Now assume that the user drops a set of two or more source objects onto the transient identifier H 208 at the same time. In one implementation, the MMC automatically distributes source objects in the set to appropriate pages of the photo journal based on any combination of factors described in the next subsection. For example, the MMC can generate a score for each pairing of an individual source object and a candidate page of the photo journal based on the assessed content-related similarity between the source object and that candidate page. The MMC can then distribute each source object to the page having the highest score, e.g., by distributing a picture of a canal boat to a page pertaining to the city of Venice. In other examples, a compound destination can represent a heterogeneous group of target destinations, meaning a group that does not conform to a single content-related theme. Optionally, the MMC may ask the user's permission prior to distributing source objects to target destinations within a compound destination.

In one implementation, the user may configure the MMC to define one or more desired compound target destinations. In another implementation, the MMC can automatically create one or more compound target destinations by using semantic clustering to identify groups of related target destinations.

A.2. Illustrative Implementation of the MMC

Figure 7:
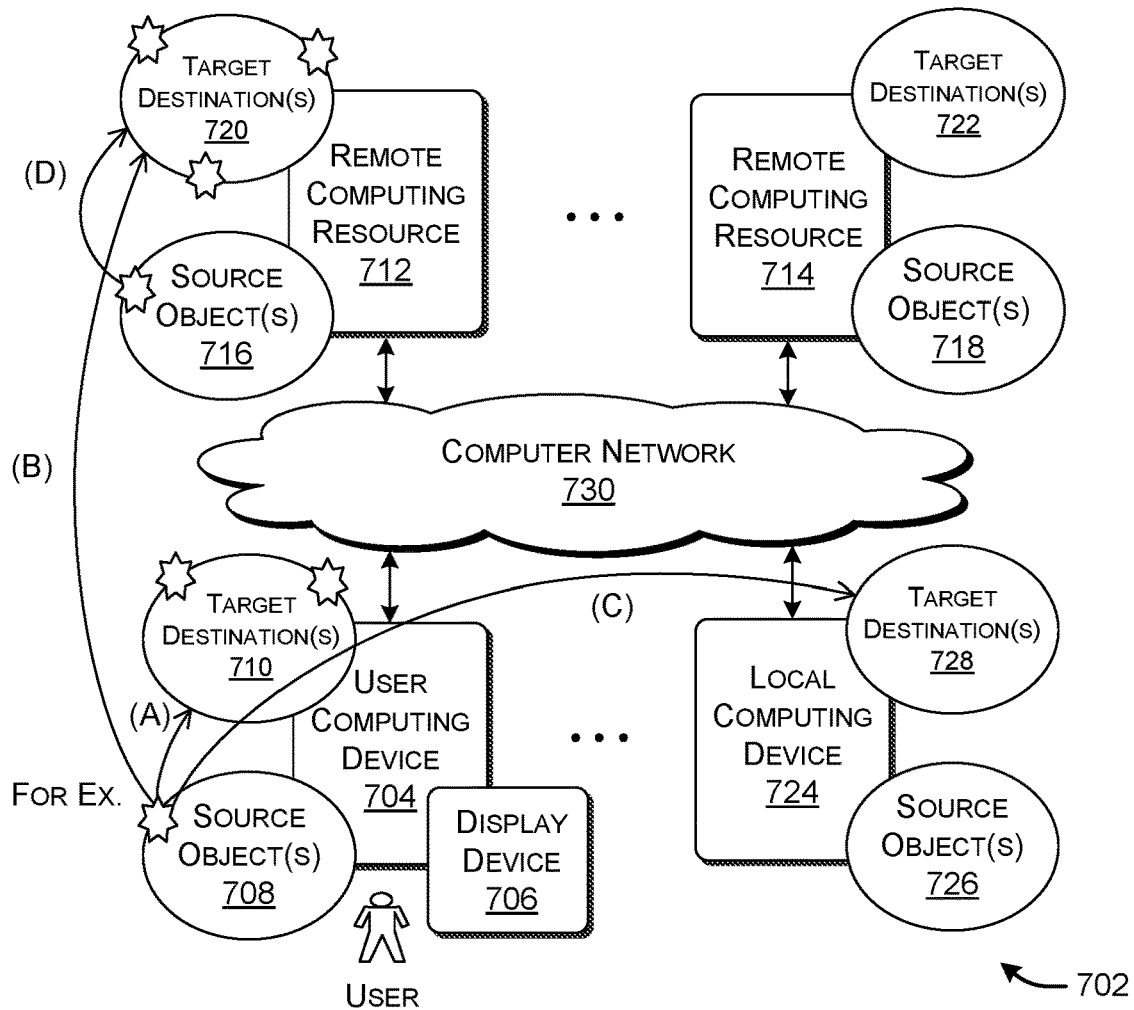
FIG. 7 shows one illustrative computing system for implementing the MMC.

FIG. 7 shows one illustrative computing system 702 for implementing the MMC. Assume that a user interacts with the MMC via a local user computing device 704. That local user computing device 704 may correspond to a desktop computing device, a laptop computing device, a game console, a tablet-type computing device, a smartphone or other type of handheld computing device, a wearable computing device, a mixed-reality device (e.g., a head-mounted display), and so on. The local user computing device 704 includes a separate or integrated display device 706.

The source objects and target destinations may be distributed among different entities in the computing system 702 in any manner. For example, the user computing device 704 can include local applications or other local resources that host one or more source objects 708. The user computing device 704 may also include target applications or other resources that correspond to one or more target destinations 710.

The computing system 702 also includes one or more remote computing devices (712, 714, . . . ) that host source objects (716, 718, . . . ) and target destinations (720, 722, . . . ). The remote computing devices (712, 714, . . . ) may correspond to respective servers. Further, the computing system 702 may include other user computing devices operated by other users (and/or the same user who operates the user computing device 704). For instance, a representative user computing device 724 may be associated with a friend or family member of the user who operates the user computing device 704. The other user computing device 724 may also host one or more source objects 726 and one or more target destinations 728. The user computing device 704 may interact with any of the above-identified computing devices (or resources) (712, 718, 724, . . . ) via a computer network 730. The computer network 730 can correspond to a local area network, a wide area network (e.g., the Internet), one or more point-to-point links), or any combination thereof. The computer network 730 may be governed by any protocol or combination of protocols. In addition, the user computing device 704 may communicate with the user computing device 724 in a direct manner, e.g., via Near Field Communication (NFC) or the like.

The MMC itself can be distributed among the various components described above. For instance, in one implementation, the local user computing device 704 includes an operating system which implements the entirety of the MMC's logic. In another case, one or more remote servers implement the entirety of the MMC's logic. In another case, the MMC's logic is implemented by a distributed combination of local and remote processing resources.

FIG. 7 shows four illustrative scenarios in which a source object is moved to a target destination. Each scenario involves the transfer of digital information associated with the source object to a target destination. In scenario (A), the MMC transfers a local source object provided by the user computing device 704 to a local target destination also provided by the user computing device 704. In scenario (B), the MMC transfers a local source object provided by the user computing device 704 to a remote target destination associated with the remote computing resource 712. In scenario (C), the MMC transfers a local source object provided by the user computing device 704 to a target destination provided by the other user computing device 724. For example, the user may transfer a source object to a photo journal maintained by his wife's local computing device. In scenario (D), the MMC transfers a remotely stored source object provided by the remote computing resource 712 to a remote target destination provided by the same remote computing resource 712. This non-exhaustive set of example scenarios is presented in the spirit of illustration, not limitation.

Figure 8:
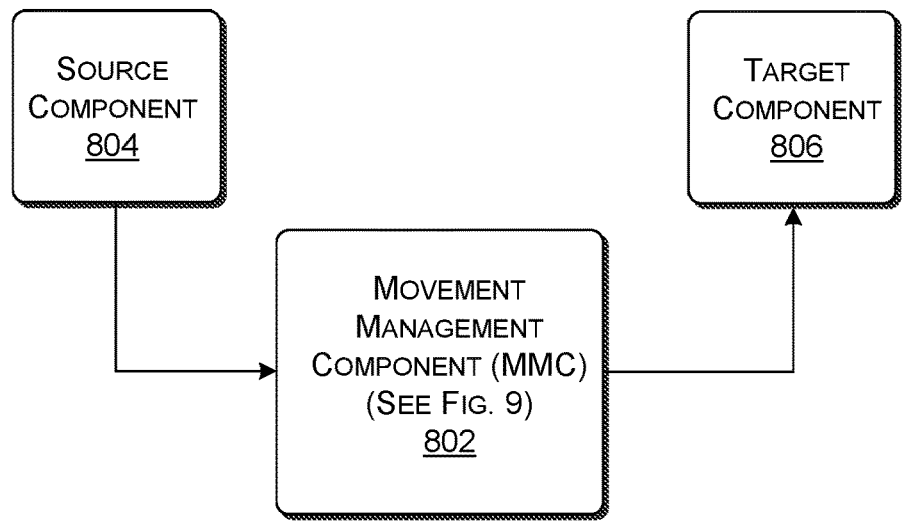
FIG. 8 shows one way in which the MMC may interact with a source component (which supplies the source object) and a target component (which receives the source object and is associated with a target destination).

FIG. 8 shows the relation of an MMC 802 to a source component 804 and a target component 806. The source component 804 supplies the source object. For instance, the source component 804 may correspond to any application that is provided by any computing device shown in FIG. 7, which supplies the source object (such as a digital photograph). The target component 806 implements the target destination. For example, the target component 806 may correspond to a target application (e.g., a photo journal) provided by any of the computing devices shown in FIG. 7. In other cases, the source component 804 and/or the target component 806 correspond to components provided by an operating system.

In one implementation, the MMC 802 corresponds to logic provided by an operating system, such as the operating system of the local user computing device 704. The source component 804 may provide a handoff signal to the MMC 802 when it detects that the user has started to drag the source object. That handoff signal contains a description of the source object. The MMC 802 then handles the drag-related behavior described in Subsection A.1, including enhancing on-screen target identifiers and presenting transient target identifiers. The MMC 802 sends a handoff signal to the target component 806 when it determines that the user has dropped the source object onto a target identifier associated with a target destination. That handoff signal again describes the source object. The target component 806 then processes the source object in an application-specific manner, such as by storing a digital photograph in a page of a photo journal.

In another implementation, the MMC 802 can provide application programming interfaces (APIs) with which the source component 804 and/or the target component 806 may interact. For instance, the source component 804 may invoke an API to send a data package to the MMC 802 upon determining that the user has commenced a drag operation.

Figure 9:
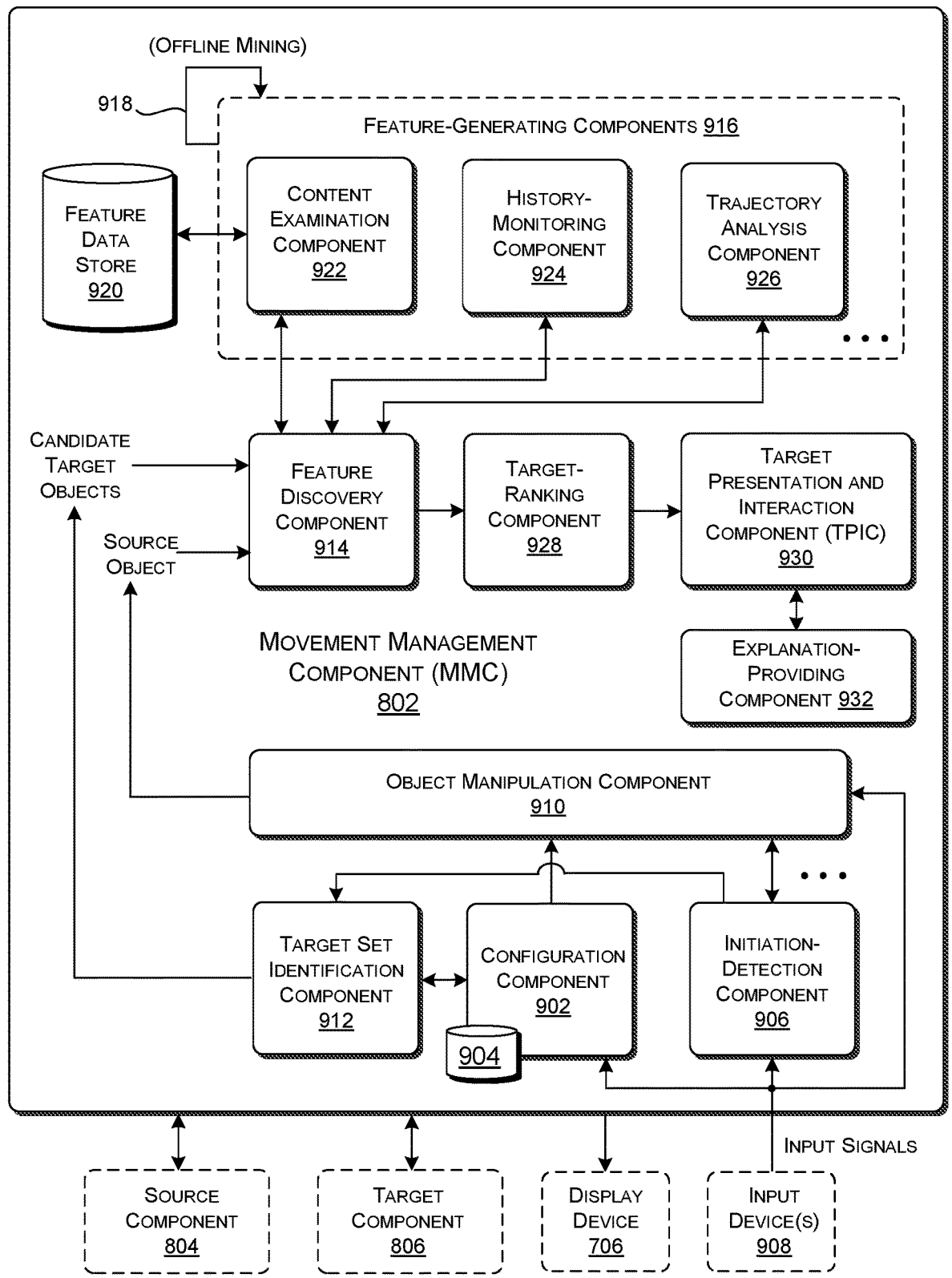
FIG. 9 shows a more detailed illustrative implementation of the MMC.

FIG. 9 shows a more detailed implementation of the MMC 802. The MMC 802 includes a configuration component 902 that allows a user to define various aspects of the way in which the MMC 802 operates. The configuration component 902 stores configuration settings in a configuration data store 904.

For instance, when invoked, the configuration component 902 can present the user interface presentation 1002 shown in FIG. 10. Through that user interface presentation 1002, the configuration component 902 allows the user to specify a set of target destinations to which source objects may be directed, and/or a set of source destinations from which source objects may be drawn. The configuration component 902 can also allow the user to specify the type of source objects that are permitted to be moved. In the merely illustrative case of FIG. 10, the configuration component 902 allows the user to specify whether personal content and/or work-related content may be moved; but other implementations can categorize content into any number of environment-specific types.

The configuration component 902 can also allow the user to specify whether the MMC 802 will produce its target-enhancing effect for on-screen target identifiers, or transient target identifiers, or a combination of on-screen and transient target identifiers. The configuration component 902 can also solicit input from the user that governs the on-screen target identifier behavior and the transient target identifier behavior. For instance, the user can specify a gesture which will invoke the process whereby the MMC 802 enhances the target identifiers.

In addition, the configuration component 902 can allow the user to customize the behavior of the analysis performed by the MMC 802 (described below) in any manner. For example, the user can define preferences that govern the way that the MMC links source objects to respective target destinations. For instance, by setting such a preference, the user could ensure that, when the user begins to manipulate a source object of a specified kind, the MMC will pick the top-ranking target destination using analysis specified by the user's expressed preference. In other implementations, the configuration component 902 can allow the user to create more complex custom rules that govern its ranking of target destinations, such as by defining custom IF-THEN-structured rules.

Returning to FIG. 9, an initiation-detection component 906 provides logic for determining when to invoke the MMC's processing of target destinations. For instance, the initiation-detection component 904 can determine that the user has commenced a drag operation when it receives a handoff signal from the source component 804. In one implementation, the initiation-detection component 906 immediately invokes the MMC's processing of target destinations when the user begins the drag operation. In another case, the initiation-detection component 906 invokes the MMC's processing of target destinations only when additional factors are met. For instance, the initiation-detection component 906 can invoke the MMC's processing of target destinations when the user takes more than a prescribed amount of time to move the source object to a target identifier, or when the user pauses the drag operation for more than a prescribed amount of time at any location on the user interface presentation 102 other than a target identifier.

The initiation-detection component 906 can detect the above-described gestures by comparing input signals provided by one or more input devices 908 with telltale patterns associated with a set of predetermined gestures. Illustrative input devices 908 include a touch-based input surface, a pen input device, a mouse input device, and so on. The initiation-detection component 906 can use discrete algorithms, machine-trained models (e.g., Hidden Markov Models), etc. to compare the input signals against known patterns.

An object manipulation component 910 provides whatever user interface experience accompanies the user's drag gesture. For instance, the object manipulation component 910 displays the source object as it is moved from the source domain to a target identifier.

A target set identification component 912 identifies a set of candidate target destinations to be analyzed. In one manner of operation, the target set identification component 912 first consults with the settings provided in the configuration data store 904 to determine what target destinations it is permitted to examine. The target set identification component 912 can then examine each authorized source of target destinations to determine the target destinations it contains. For instance, the target set identification component 912 can perform this task by examining the file system of a computing device and identifying the applications or other resources it contains that may constitute target destinations.

A feature discovery component 914 identifies a first set of features that describe the source object, and a second set of features that describes each candidate target destination. A feature refers to any characteristic of the source object or a target destination. In some cases, a target destination is composed of plural target objects or other parts. For example, a target destination associated with an online photo journal is composed of plural digital photographs. In that scenario, the feature discovery component 914 can provide features which collectively describe target objects associated with the target destination. The same applies to the source object in those scenarios in which the source object is composed of plural sub-objects which the user moves as a group.

The feature discovery component 914 relies on a collection of feature-generating components 916 to generate the features. In one manner of operation, the feature-generating components 916 operate in an online manner, that is, by performing analysis in real time in response to the user's selection of a source object. Alternatively, or in addition, the feature discovery components 916 can perform at least some of their work in an offline manner. For instance, the feature-generating components 916 can perform analysis on the digital photographs in a user's photo journal in an offline manner, prior to the beginning of a drag operation. FIG. 9 illustrates the possible use of offline data mining by the loop 918. More specifically, the loop 918 indicates that offline data mining may operate as an ongoing process, e.g., either periodically or in an on-demand manner. The feature-generating components 916 store the features that they identify in a feature data store 920.

As to the feature-generating components 916 themselves, a content examination component 922 provides one or more features that describe the content associated with each item under consideration (where the generic term "item" is used hereinafter to refer to a source object or a target destination). For instance, the content examination component 922 can determine the subject matter of an item based on the subject-matter tags associated with the item (such as the tags associated with a digital photograph, or the keywords and title associated with a text document, etc.). In addition, or alternatively, the content examination component 922 can determine the subject matter of an item using a rules-based or machine-trained model. For example, the content examination component 922 can use a convolutional neural network (CNN) to provide an output vector which characterizes the subject matter of an image or a text document, e.g., by mapping the item into a vector in a low-dimensioned semantic space. These techniques are set forth in the spirit of illustration, not limitation; other implementations of the content examination component 922 can use other techniques to classify the content of an item.

A history-monitoring component 924 performs two recording tasks. As a first function, the history-monitoring component 924 generates information that identifies the drag-related habits of the user. For example, the history-monitoring component 924 can determine what source objects the user has moved in the past, and where the user has moved them. The history-monitoring component 924 can organize this information in any manner, such as by providing a table that lists object types along one dimension and destination types along a second dimension. The history-monitoring component 924 can maintain a running count in each cell of that table that identifies how many times the user has dragged a particular kind of source object to a particular kind of target destination. The above-described information pertains to the habits of the user who is currently interacting with the MMC 802; but the history-monitoring component 924 can also maintain information that describes the habits of a general population of users, or the habits of one or more sub-populations of users, each of which has members that have similar characteristics.

The history-monitoring component 924 can also store information which reflects a user's explicit rejection of a target identifier. For instance, assume that, on a prior occasion, the MMC 802 identifies three transient target identifiers as being relevant to a source object that the user is moving across the user interface presentation 102. Prior to dragging the source object to the intended target identifier, the user may explicitly remove one or more unwanted transient identifiers, such as by performing a gesture whereby the user swipes the transient identifiers off the screen. By doing so, the user may convey that these transient identifiers are clearly inappropriate and that the user does not wish to see them again in similar circumstances. This behavior constitutes a strong signal for use in training the MMC's model(s).

As a second function, the history-monitoring component 924 can maintain information regarding the history of any particular item. For instance, the history-monitoring component 924 can maintain information regarding: the person or entity which created the item; the date on which the item was created; the source (or sources) from which the item was taken; where the item has been previously moved; with whom the item has been previously shared (if anyone), and so on.

A trajectory analysis component 926 determines a likely target destination that a user is likely targeting based on the path over which the user has moved a source object on the user interface presentation 102, with respect to a current state of that path. The trajectory analysis component 926 can perform this task by fitting a line that describes the user's current path of movement, such as a linear line or a parabolic line, etc. The trajectory analysis component 926 then extends that line to an edge of the user interface presentation 102. The trajectory analysis component 926 then identifies any on-screen target identifiers that lie within a prescribed distance to the line; those on-screen target identifiers define the most likely targets of the user's drag movement, with the most relevant target being associated with a target identifier that is closest to the line. The trajectory analysis component 926 can also provide a certainty score which reflects the confidence of its assessment. The confidence score can depend on the current length of the user's drag-trajectory, a number of viable target identifiers within a prescribed distance of the line, the drag-related habits of the user, etc.

The feature-generating component 916 can include yet other sources of features, although not specifically enumerated in FIG. 9. For example, another source can provide information regarding the type of file associated with the item. Another source can provide information regarding a rating associated with an item. Another source can provide information regarding the permissions associated with an item, and so on.

A target-ranking component 928 generates an output score for each pairing of a source object (which is associated with a first set of features) and a candidate target destination (which is associated with a second set of features). In one implementation, the output score relates to a distance in semantic space between the source object and a candidate target destination. The target-ranking component 928 generates the output score using a rules-based algorithm, a machine-trained model, or some other approach. Without limitation, FIG. 11 described below shows an illustrative approach that uses a deep neural network (DNN) to perform this task.

The target-ranking component 928 performs further processing on the output scores that it generates. For example, the target-ranking component 928 can select output scores above a prescribed threshold value. In addition, or alternatively, the target-ranking component 928 can select the n highest scores, where n is a user-configurable parameter value. This means that the user interface presentation 102 will display, at most, n enhanced target identifiers. In other cases, the target-ranking component 928 can select the k highest scores associated with on-screen target identifiers, and the m highest scores associated with transient target identifiers.

A target presentation and interaction component (TPIC) 930 enhances target identifiers that are associated with respective target destinations, based on their respective output scores. For instance, the TPIC 930 can perform any combination of the techniques set forth in Subsection A.1 to enhance the on-screen target identifiers, such as by changing the size, intensity, color, etc. of the on-screen target identifiers. The TPIC 930 can also control the appearance and removal of transient target identifiers. The TPIC 930 can also modify characteristics of transient target identifiers using any of the techniques that it applies to on-screen target identifiers, e.g., by showing a transient target identifier that is especially relevant using a glow effect.

An explanation-providing component 932 provides an optional explanation that may accompany its enhancement of each target identifier, such as the illustrative explanation 214 shown in FIG. 2. For instance, consider an illustrative pairing between a source object and a candidate target destination. The explanation-providing component 932 can map the features associated with this pairing to an explanation. It can perform this task using any feature-to-mapping technique, e.g., by using a lookup table or a machine-trained model that performs free-form generation of text (such as a recurrent neural network (RNN)). For instance, in one scenario, the lookup table provides pre-stored text that explains that the pairing is appropriate because the content of the source object closely matches the content of the target destination. In another scenario, the lookup table may include text that explains that the pairing is appropriate because the user frequently moves source objects of the current type to the target destination, and so on.

Figure 11:
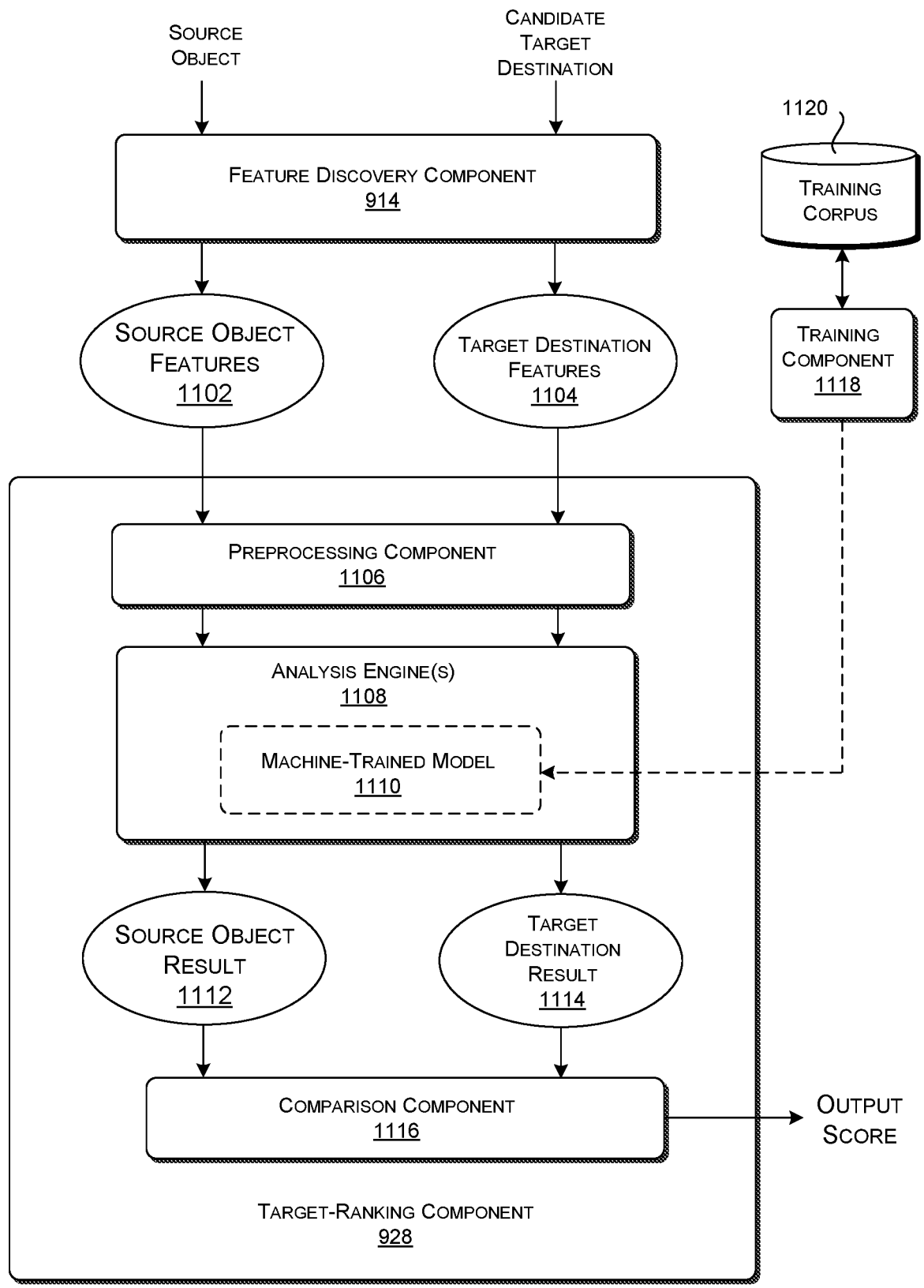
FIG. 11 shows one implementation of a target-ranking component, which is one component of the MMC.

FIG. 11 shows one implementation of the target-ranking component 928. The target-ranking component 928 receives a first set of features 1102 from the feature discovery component 914 that describes the source object, and a set second of features 1104 from the feature discovery component 914 that describes a candidate target destination. It outputs a score which identifies the semantic distance between source object and the candidate target destination.

A preprocessing component 1106 converts each set of features into a form that can be further analyzed by an analysis engine 1108. For instance, the preprocessing component 1106 can map each feature into an input value (or values). It can then map the input value(s) into an input vector or vectors, such as a one-hot vector. The preprocessing component 1106 can perform this task using a lookup table, hashing function, a separate neural network, etc.

The analysis engine 1108 can use a machine-trained model 1110 to map the input information associated with the source object to a source object result 1112, e.g., corresponding to a first vector in a low-dimensioned semantic space. The analysis engine 1108 can use the machine-trained model 1110 to map the input information associated with the target destination to a target destination result 1114, e.g., corresponding to a second vector in semantic space. For instance, the machine-trained model 1110 can correspond to a deep neural network (DNN). A comparison component 1116 can determine the distance between the source object result 1112 and the target destination result 1114, to provide the output score. For instance, the comparison component 1116 can compute a cosine similarity distance metric, a Euclidean distance metric, a Manhattan distinct metric, etc.

Generally, a feedforward neural network can include N layers of neurons that map an input vector $z_1$ into an output vector y. The values in any layer j may be given by the formula, $z_j=f(W_j z_{j-1}+b_j)$, for j=2, . . . N. The symbol $W_j$ denotes the j-th weight matrix produced by a training component 1118, and the symbol $b_j$ refers to an optional j-th bias vector, also produced by the training component 1118. The function $f(x)$, referred to as the activation function, can be formulated in different ways, such as the tan h function. Information regarding the general topic of deep neural networks can be found, for instance, in U.S. Published Patent Application No. 20150074027 to Huang, et al., published on Mar. 12, 2015, and entitled "A Deep Structured Semantic Model Produced Using Click-Through Data."

The training component 1118 produces the above-identified parameter values by processing training examples in a data store 1120. For instance, the training examples include positive examples and negative examples. Each positive example includes a pair of items (A and B) that have a known relationship (that is, where A is positively related to B). Each negative example includes a pair of items (A and B) that do not have a relationship (that is, where A is not related to B). An example-mining engine (not shown) can collect the positive examples from any source, such as an online repository of documents. That is, the example-mining engine can consider two items that are extracted from a same document or document part as related. The example-mining engine can simulate each negative example by randomly creating a pair of items, the assumption being that the items that are paired together are unrelated. The training component 1118 can apply an appropriate training objective, such as by iteratively deriving parameter values which maximize the model's ability to predict correct relevance assessments and minimizing the model's tendency to produce incorrect relevance assessments. The training component 1118 can use any technique to perform the training, such as gradient descent in conjunction with backpropagation.

The above-described use of a DNN is described in the spirit of illustration, not limitation. Other implementations can use other machine-trained models, such as linear regression model, a support vector machine model, A Bayesian network model, a decision tree model, a clustering-based model, and so on.

B. Illustrative Processes

FIGS. 12-16 show processes that explain the operation of the MMC 802 of Section A in flowchart form. Since the principles underlying the operation of the MMC 802 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

Figure 12:
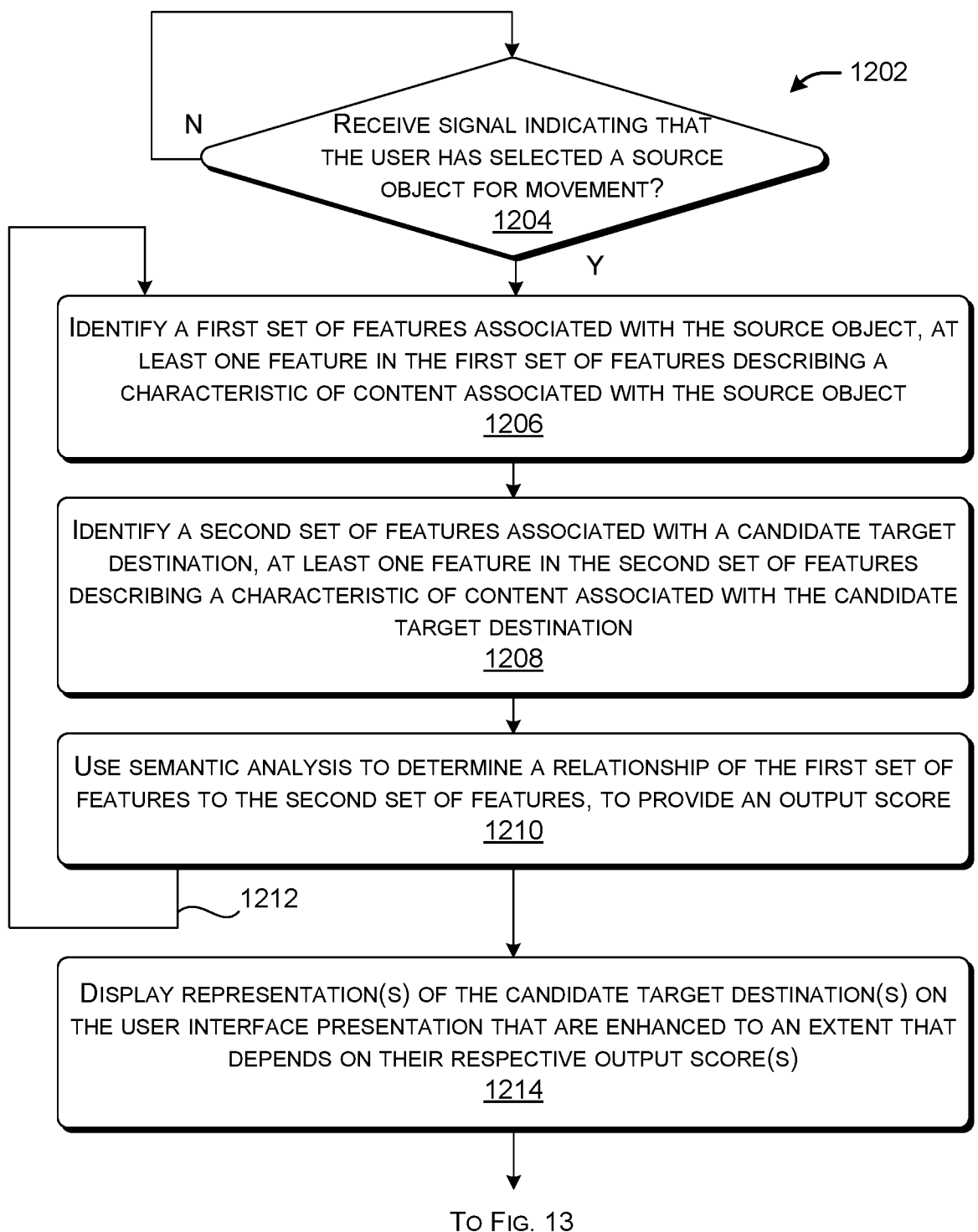
FIGS. 12 and 13 collectively show a process that represents one manner of operation of the MMC.
Figures 13, 14:
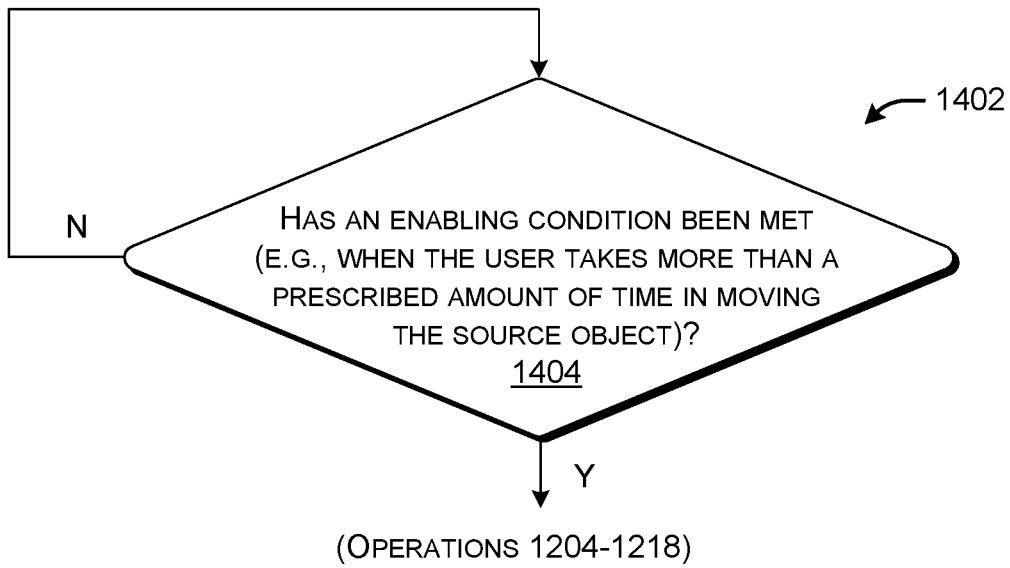
FIG. 14 is a process that shows one way of invoking the enhancement of a target identifier when the user moves a source object.

FIGS. 12-13 collectively show a process 1202 for facilitating the movement of a source object to a target destination. In block 1204, the movement management component (MMC) 802 receives a signal that indicates that a user has selected a source object for movement, the source object being presented in a source domain of a user interface presentation 102 that is displayed on a display device 706. For instance, the MMC 802 may receive such a signal from the source component 804 of FIG. 8. In block 1206, the MMC 802 identifies a first set of features associated with the source object. In block 1208, the MMC 802 identifies a second set of features associated with a candidate target destination. In block 1210, the MMC 802 uses semantic analysis to determine a relationship of the first set of features to the second set of features, to provide an output score. The loop 1212 indicates the above-described processing is repeated one or more times for other candidate target destinations, to overall generate a plurality of output scores.

Another implementation may compare the source object with plural candidate destination in a parallel manner, rather than a serial manner.

In block 1214, the MMC 802 displays representation(s) of the candidate target destination(s) on the user interface presentation 102 that are visually enhanced to an extent that depends on their respective output score(s). On one end of the spectrum of enhancement, the MMC 802 will display no representation of a target destination at all. Note that, in deciding how and when to enhance a representation of a target destination, the MMC 802 can apply various analyses, such as, without limitation, by comparing the target destination's score with a threshold value, by comparing the target destination's score with other target destinations' scores (and selecting the n best scores), and so on.

In block 1216 (of FIG. 13), the MMC 802 receives an instruction from the user to move the source object to a representation of a selected candidate target destination, which may or may not have been visually enhanced. And in block 1218, the MMC 802 moves the source object on the user interface presentation 102 to the representation of the selected candidate target destination, which causes the source object to be associated with the selected target destination.

FIG. 14 is a process 1402 that shows one way of invoking the process 1202 of FIGS. 12-13. In block 1404, the MMC 802 determines if some enabling condition has been met, such as the user merely beginning a drag operation, or the user taking more than a prescribed amount of time to perform the drag operation, or the user pausing the drag operation for more than a prescribed amount time, and so on. If so, then the MMC 802 performs the process 1202 shown in FIGS. 12-13.

Figure 15:
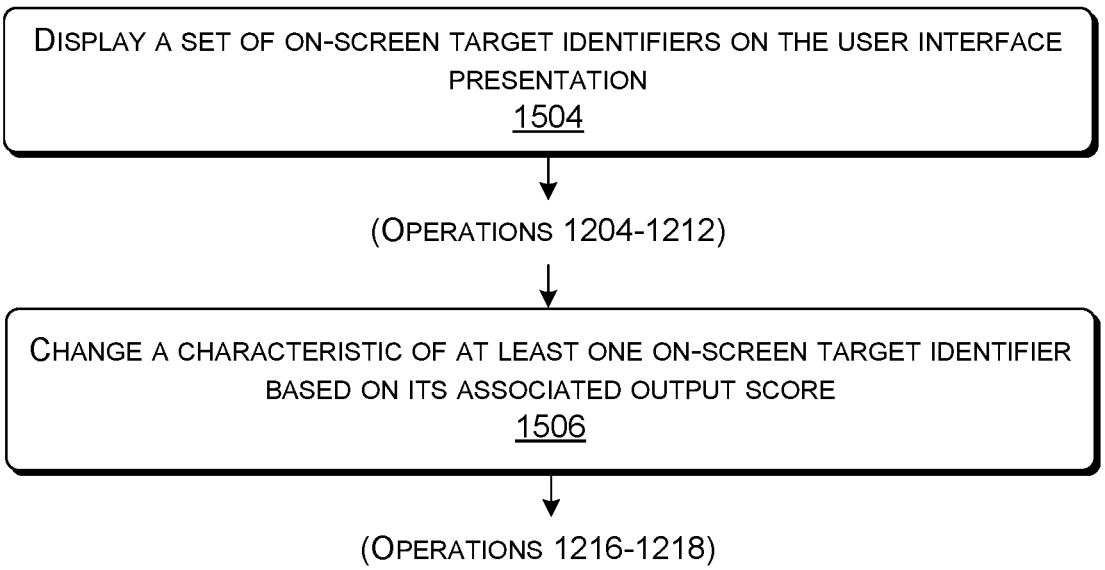
FIG. 15 shows an implementation of the process of FIGS. 12-13 for the case in which the MMC enhances on-screen target identifiers (that were already present on the user interface presentation at the start of the movement operation).

FIG. 15 shows a process 1502 that represents an instantiation of the process 1202 of FIGS. 12-13, performed for the case in which at least one target identifier is an on-screen target identifier. In block 1504, the MMC 802 displays a set of on-screen target identifiers on the user interface presentation 102, such as the on-screen target identifiers (110, 112) shown in FIG. 1. In block 1506, the MMC 802 changes a characteristic of at least one on-screen target identifier based on its associated output score. The process 1502 then performs block 1216-1218 of FIG. 13.

Figure 16:
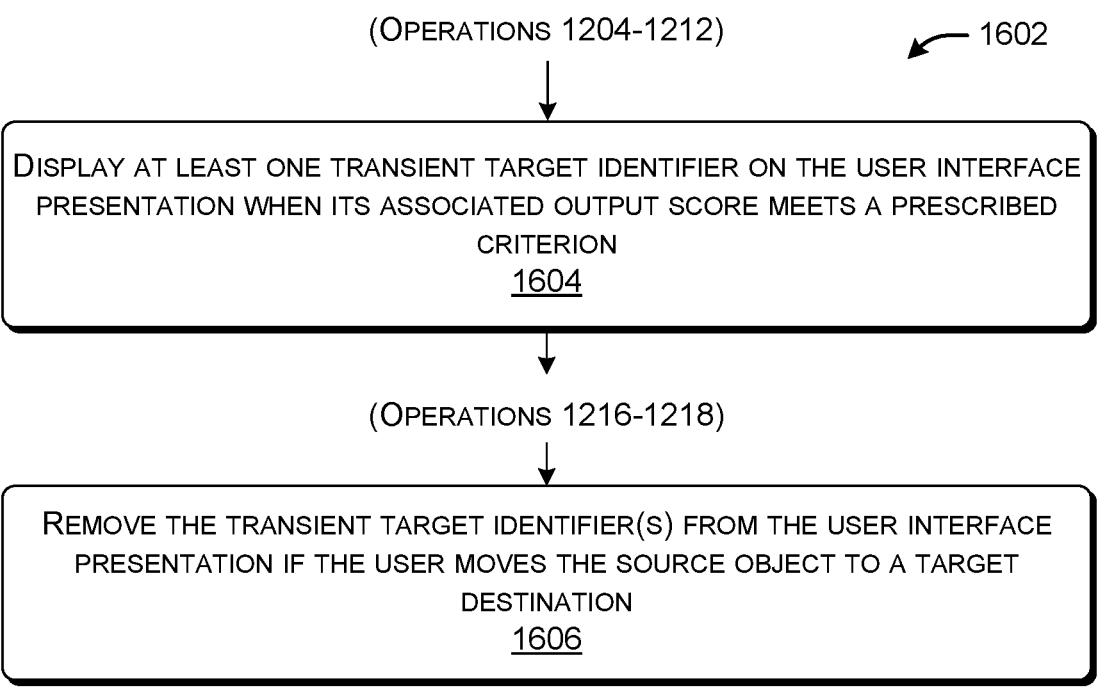
FIG. 16 shows an implementation of the process of FIGS. 12-13 for the case in which the MMC displays transient target identifiers (that were not already present on the user interface presentation at the start of the movement operation).

FIG. 16 shows a process 1602 that represents another instantiation of the process 1202 of FIGS. 12-13, performed for the case in which at least one target identifier is a transient target identifier. In block 1604, after performing blocks 1204-1212 of FIG. 12, the MMC 802 displays at least one transient target identifier associated with a candidate target destination on the user interface presentation 102 (such as the transient target identifier 208 shown in FIG. 2); it does this when the candidate target destination's output score meets a prescribed criterion. In block 1606, after performing blocks 1216-1218 of FIG. 13, the MMC 802 removes the transient target identifier(s) from the user interface presentation 102 if the user moves the source object to a target destination.

C. Representative Computing Functionality

Figure 17:
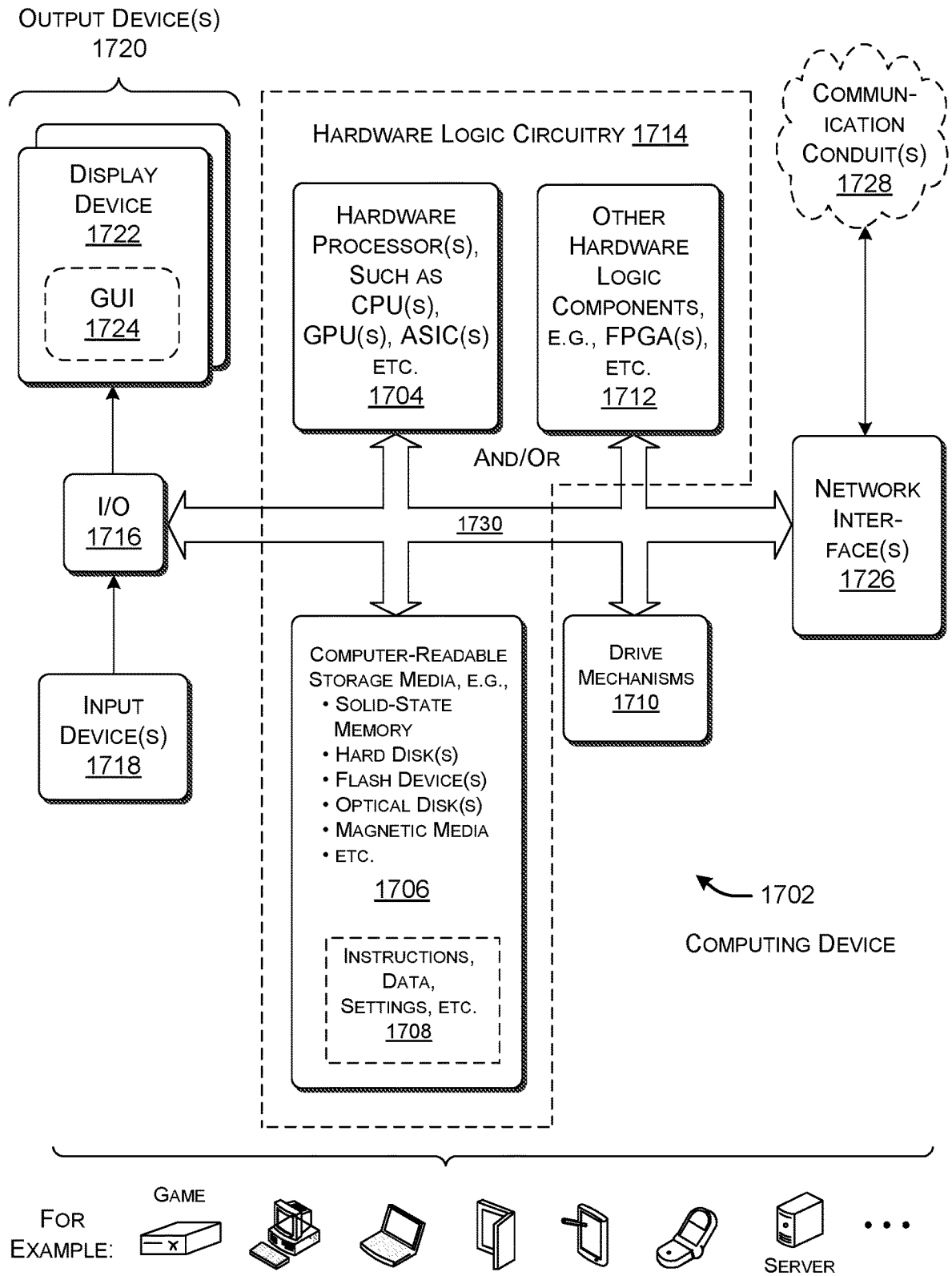
FIG. 17 shows an illustrative type of computing device that can be used to implement any aspect of the features shown in the foregoing drawings.

FIG. 17 shows a computing device 1702 that can be used to implement any aspect of the mechanisms set forth in the above-described figures. For instance, the type of computing device 1702 shown in FIG. 17 can be used to implement any local computing device or remote computing resource shown in FIG. 7. In all cases, the computing device 1702 represents a physical and tangible processing mechanism.

The computing device 1702 can include one or more hardware processors 1704. The hardware processor(s) 1704 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1702 can also include computer-readable storage media 1706, corresponding to one or more computer-readable media hardware units. The computer-readable storage media 1706 retains any kind of information 1708, such as machine-readable instructions, settings, data, etc. Without limitation, for instance, the computer-readable storage media 1706 may include one or more solid-state devices, one or more magnetic hard disks, one or more optical disks, magnetic tape, and so on. Any instance of the computer-readable storage media 1706 can use any technology for storing and retrieving information. Further, any instance of the computer-readable storage media 1706 may represent a fixed or removable component of the computing device 1702. Further, any instance of the computer-readable storage media 1706 may provide volatile or non-volatile retention of information.

The computing device 1702 can utilize any instance of the computer-readable storage media 1706 in different ways. For example, any instance of the computer-readable storage media 1706 may represent a hardware memory unit (such as Random Access Memory (RAM)) for storing transient information during execution of a program by the computing device 1702, and/or a hardware storage unit (such as a hard disk) for retaining/archiving information on a more permanent basis. In the latter case, the computing device 1702 also includes one or more drive mechanisms 1710 (such as a hard drive mechanism) for storing and retrieving information from an instance of the computer-readable storage media 1706.

The computing device 1702 may perform any of the functions described above when the hardware processor(s) 1704 carry out computer-readable instructions stored in any instance of the computer-readable storage media 1706. For instance, the computing device 1702 may carry out computer-readable instructions to perform each block of the processes described in Section B.

Alternatively, or in addition, the computing device 1702 may rely on one or more other hardware logic components 1712 to perform operations using a task-specific collection of logic gates. For instance, the hardware logic component(s) 1712 may include a fixed configuration of hardware logic gates, e.g., that are created and set at the time of manufacture, and thereafter unalterable. Alternatively, or in addition, the other hardware logic component(s) 1712 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 17 generally indicates that hardware logic circuitry 1714 corresponds to any combination of the hardware processor(s) 1704, the computer-readable storage media 1706, and/or the other hardware logic component(s) 1712. That is, the computing device 1702 can employ any combination of the hardware processor(s) 1704 that execute machine-readable instructions provided in the computer-readable storage media 1706, and/or one or more other hardware logic component(s) 1712 that perform operations using a fixed and/or programmable collection of hardware logic gates.

In some cases (e.g., in the case in which the computing device 1702 represents a user computing device), the computing device 1702 also includes an input/output interface 1716 for receiving various inputs (via input devices 1718), and for providing various outputs (via output devices 1720). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1722 and an associated graphical user interface presentation (GUI) 1724. The display device 1722 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1702 can also include one or more network interfaces 1726 for exchanging data with other devices via one or more communication conduits 1728. One or more communication buses 1730 communicatively couple the above-described components together.

The communication conduit(s) 1728 can be implemented in any manner, e.g., by a local area computer network, a wide area computer network (e.g., the Internet), point-to-point connections, etc., or any combination thereof. The communication conduit(s) 1728 can include any combination of hardwired links, wireless links, routers, gateway functionality, name servers, etc., governed by any protocol or combination of protocols.

FIG. 17 shows the computing device 1702 as being composed of a discrete collection of separate units. In some cases, the collection of units may correspond to discrete hardware units provided in a computing device chassis having any form factor. FIG. 17 shows illustrative form factors in its bottom portion. In other cases, the computing device 1702 can include a hardware logic component that integrates the functions of two or more of the units shown in FIG. 1. For instance, the computing device 1702 can include a system on a chip (SoC or SOC), corresponding to an integrated circuit that combines the functions of two or more of the units shown in FIG. 17.

The following summary provides a non-exhaustive set of illustrative aspects of the technology set forth herein.

According to a first aspect, one or more computing devices are described herein for facilitating the movement of an object to a target destination. The device(s) include hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates. The operations include, for at least one pairing of a source object and a candidate target destination: receiving a signal that indicates that a user has selected the source object for movement, the source object being presented in a source domain of a user interface presentation that is displayed on a display device; identifying a first set of features associated with the source object, at least one feature in the first set of features describing a characteristic of content associated with the source object; identifying a second set of features associated with the candidate target destination, at least one feature in the second set of features describing a characteristic of content associated with the candidate target destination; using semantic analysis to determine a relationship of the first set of features to the second set of features, to provide an output score; displaying a representation of the candidate target destination on the user interface presentation that is visually enhanced to an extent that is dependent on the output score; receiving an instruction from the user to move the source object to a representation of a selected candidate target destination; and moving the source object on the user interface presentation to the representation of the selected target destination, which causes the source object to become associated with the selected target destination.

According to a second aspect, the operations further include determining scores for plural candidate target destinations, and presenting a representation of each candidate target destination that is enhanced by an amount that is a function of its respective score.

According to a third aspect, the operation of displaying a representation of the target destination is performed when the user takes more than a prescribed amount of time in moving the source object to a chosen target destination.

According to a fourth aspect, the candidate target destination is associated with a resource that is local with respect to the user.

According to a fifth aspect, the candidate target destination is associated with a resource that is remote with respect to the user.

According to a sixth aspect, the operations further include, prior to movement of the source object, displaying a set of on-screen target identifiers on the user interface presentation, one of the on-screen target identifiers corresponding to the candidate target destination. In that case, the operation of displaying a representation includes changing a characteristic of the on-screen target identifier that is associated with the candidate target destination.

According to a seventh aspect, the characteristic of the on-screen target identifier that is changed controls: an appearance of the on-screen target identifier; and/or a rating-related label associated with the on-screen target identifier; and/or an order in which the on-screen target identifier appears on the user interface presentation relative to the other on-screen target identifiers.

According to an eighth aspect, the operation of displaying a representation of the candidate target destination includes displaying a transient target identifier of the candidate target destination on the user interface presentation. The transient target identifier appears on the user interface presentation in response to the user moving the source object.

According to a ninth aspect (dependent on the eighth aspect), the operations further include removing the transient target identifier from the user interface presentation if the user moves the source object to any target destination.

According to a tenth aspect (dependent on the eighth aspect), the candidate target destination includes plural target sub-destinations. Further, the transient target identifier includes a group of child target identifiers associated with the respective target sub-destinations.

According to an eleventh aspect (dependent on the eighth aspect), the operations further include: determining that a particular transient target identifier has been previously displayed on the user interface presentation a number of times that satisfies a prescribed threshold value; and associated the particular transient target identifier with a particular physical section of a screen which presents the user interface presentation.

According to a twelfth aspect, the target destination is associated with one or more target objects. Further, the operation of identifying a second set of features includes identifying features associated with the target object(s).

According to a thirteenth aspect, 13, the operation of identifying the first set of features and/or the operation of identifying the second set of features includes identifying at least one feature that depends on previous behavior of the user in moving source objects to target destinations.

According to a fourteenth aspect, the operation of identifying the first set of features and/or the operation of identifying the second set of features includes identifying at least one feature that depends on a history of an object under consideration.

According to a fifteenth aspect, the operation of identifying the second set of features includes: predicting a target destination to which the user is moving the source object; and identifying at least one feature that describes the target destination that is predicted.

According to a sixteenth aspect, the operation of using semantic analysis involves using a machine-trained model to provide the output score.

According to a seventeenth aspect, a method is described for facilitating the movement of an object to a target destination. The method includes, for at least one pairing of a source object and a candidate target destination: receiving a signal that indicates that a user has selected the source object for movement, the source object being presented in a source domain of a user interface presentation that is displayed on a display device; identifying a first set of features associated with the source object, at least one feature in the first set of features describing a characteristic of content associated with the source object; identifying a second set of features associated with the candidate target destination, at least one feature in the second set of features describing a characteristic of content associated with the candidate target destination; using semantic analysis, based on a machine-trained model, to determine a relationship of the first set of features to the second set of features, to provide an output score; displaying a representation of the candidate target destination on the user interface presentation that is visually enhanced to an extent that is dependent on the output score; receiving an instruction from the user to move the source object to a representation of a selected target destination; and moving the source object on the user interface presentation to the representation of the selected target destination, which causes the source object to become associated with the selected target destination.

According to an eighteenth aspect, the method (of the seventeenth aspect) further includes, prior to movement of the source object, displaying a set of on-screen target identifiers on the user interface presentation, one of the on-screen target identifiers corresponding to the candidate target destination. Further, the operation of displaying a representation includes changing a characteristic of the on-screen target identifier that is associated with the candidate target destination.

According to a nineteenth aspect (dependent on the seventeenth aspect), the operation of displaying a representation of the candidate target destination includes displaying a transient target identifier of the candidate target destination on the user interface presentation. The transient target identifier appears on the user interface presentation in response to the user moving the source object. Further, the method includes removing the transient target identifier from the user interface presentation if the user moves the source object to any target destination.

According to a twentieth aspect, a computer-readable storage medium is described for storing computer-readable instructions. The computer-readable instructions, when executed by one or more hardware processors, perform a method. The method includes, for at least one pairing of a source object and a candidate target destination: receiving a signal that indicates that a user has selected the source object for movement, the source object being presented in a source domain of a user interface presentation that is displayed on a display device; identifying a first set of features associated with the source object; identifying a second set of features associated with the candidate target destination; using semantic analysis to determine a distance between the first set of features and the second set of features, to provide an output score; displaying a transient target identifier associated with the candidate target destination on the user interface presentation when the output score of the candidate target destination meets a prescribed criterion; receiving an instruction from the user to move the source object to a selected transient identifier associated with a selected target destination; dropping the source object on the selected transient target identifier; and removing the selected transient target identifier from the user interface presentation when the user drops the source object on the selected transient target identifier.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for facilitating the movement of an object to a target destination, comprising:
hardware logic circuitry, the hardware logic circuitry corresponding to: (a) one or more hardware processors that perform operations by executing machine-readable instructions stored in a memory, or (b) one or more other hardware logic components that perform the operations using a task-specific collection of logic gates, or (a) and (b), the operations including, for at least one pairing of a source object and a candidate target destination:
receiving a signal that indicates that a user has selected the source object for movement, the source object being presented in a source domain of a user interface presentation that is displayed on a display device;
identifying a first set of features associated with the source object, at least one feature in the first set of features being produced by a content examination process that maps the source object into a semantic-space expression of subject matter associated with the source object;
identifying a second set of features associated with the candidate target destination, at least one feature in the second set of features being produced by the content examination process, the content examination process mapping the candidate target destination into a semantic-space expression of subject matter associated with the candidate target destination,
at least one other feature in the second set of features depending on a history of a target object associated with the candidate target destination, the history encompassing information regarding at least creation of the target object;
using semantic analysis to determine a relationship of the first set of features to the second set of features in a semantic space, to provide an output score;
displaying a representation of the candidate target destination on the user interface presentation that is visually enhanced to an extent that is dependent on the output score;
receiving an instruction from the user to move the source object to a representation of a selected candidate target destination; and
moving the source object on the user interface presentation to the representation of the selected target destination, which causes the source object to become associated with the selected target destination,
the content examination process applying to different types of candidate target destinations, including candidate target destinations associated with applications.

2. The one or more computing devices of claim 1, wherein the operations further include, prior to movement of the source object, displaying a set of on-screen target identifiers on the user interface presentation, the on-screen target identifiers corresponding to respective candidate target destinations, and
wherein said displaying a representation includes changing a rating label of an on-screen target identifier that is associated with the candidate target destination.

3. The one or more computing devices of claim 1, wherein said displaying a representation of the candidate target destination includes displaying a transient target identifier of the candidate target destination on the user interface presentation,
wherein the transient target identifier appears on the user interface presentation in response to the user moving the source object.

4. The one or more computing devices of claim 3, wherein the candidate target destination includes plural target sub-destinations, and wherein the transient target identifier includes a group of child target identifiers associated with the respective target sub-destinations,
wherein said displaying a representation of the candidate target destination includes spatially arranging the child target identifiers in an order based on relevance of the source object to each target sub-destination, as assessed by the semantic analysis.

5. The one or more computing devices of claim 3, wherein the operations further include:
determining that a particular transient target identifier has been previously displayed on the user interface presentation a number of times that satisfies a prescribed threshold value; and
associating the particular transient target identifier with a particular physical section of a screen which presents the user interface presentation, and henceforth omitting display of the particular transient identifier on the user interface presentation.

6. The one or more computing devices of claim 1, wherein said identifying the first set of features or said identifying the second set of features or both said identifying the first set of features and said identifying the second set of features includes identifying at least one feature that depends on previous behavior of plural users in moving source objects to target destinations.

7. The one or more computing devices of claim 1, wherein said identifying the first set of features includes identifying at least one other feature that depends on a history of the source object under consideration, the history of the source object encompassing at least information regarding creation of the source object.

8. The one or more computing devices of claim 1, wherein said using semantic analysis comprises using a machine-trained model to provide the output score.

9. A method for facilitating the movement of an object to a target destination, comprising, for at least one pairing of a source object and a candidate target destination:
receiving a signal that indicates that a user has selected the source object for movement, the source object being presented in a source domain of a user interface presentation that is displayed on a display device;
identifying a first set of features associated with the source object, at least one feature in the first set of features being produced by a content examination process that maps the source object into a semantic-space expression of subject matter associated with the source object,
at least one other feature in the first set of features depending on a history of the source object, the history encompassing information regarding at least creation of the source object;
identifying a second set of features associated with the candidate target destination, at least one feature in the second set of features being produced by the content examination process, the content examination process mapping the candidate target destination into a semantic-space expression of subject matter associated with the candidate target destination,
at least one other feature in the second set of features depending on a history of a target object associated with the candidate target destination, the history of the target object encompassing information regarding at least creation of the target object;
using semantic analysis, based on a machine-trained model, to determine a relationship of the first set of features to the second set of features in a semantic space, to provide an output score;
displaying a representation of the candidate target destination on the user interface presentation that is visually enhanced to an extent that is dependent on the output score;
receiving an instruction from the user to move the source object to a representation of a selected target destination; and
moving the source object on the user interface presentation to the representation of the selected target destination, which causes the source object to become associated with the selected target destination,
the content examination process applying to different types of candidate target destinations, including candidate target destinations associated with applications.

10. A computer-readable storage medium for storing computer-readable instructions, the computer-readable instructions, when executed by one or more hardware processors, performing a method that comprises, for at least one pairing of a source object and a candidate target destination:
receiving a signal that indicates that a user has selected the source object for movement, the source object being presented in a source domain of a user interface presentation that is displayed on a display device;
identifying a first set of features associated with the source object;
identifying a second set of features associated with the candidate target destination;
using semantic analysis to determine a distance between the first set of features and the second set of features in a semantic space, to provide an output score;
displaying a transient target identifier associated with the candidate target destination on the user interface presentation when the output score of the candidate target destination meets a prescribed criterion;
receiving an instruction from the user to move the source object to a selected transient identifier associated with a selected target destination;
dropping the source object on the selected transient target identifier; and
removing the selected transient target identifier from the user interface presentation when the user drops the source object on the selected transient target identifier,
at least one feature identifying information regarding creation of the source object or candidate target destination, and
at least one feature being produced by a content examination process that maps at least the target candidate destination into a semantic-space expression of subject matter associated with the target candidate destination,
the content examination process applying to different types of candidate target destinations, including candidate target destinations associated with applications.

11. The one or more computing devices of claim 1, wherein said at least one other feature includes information regarding a person or entity that created the target object.

12. The one or more computing devices of claim 1, wherein said at least one other feature includes information regarding a time at which the target object was created.

13. The one or more computing devices of claim 1, wherein said at least one other feature includes information regarding at least one source from which the target object was taken.

14. The one or more computing devices of claim 1, wherein said at least one other feature includes information regarding previous movement of the target object.

15. The one or more computing devices of claim 1, wherein said at least one other feature includes information regarding a person with whom the target object has been shared.

16. The one or more computing devices of claim 1, wherein the operations further include displaying an explanation on the user interface presentation that identifies why the representation of the candidate target destination has been enhanced.

17. The one or more computing devices of claim 1,
wherein the signal that is received indicates that the user is moving plural source objects at a same time, including the source object,
wherein the candidate target destination includes plural target sub-destinations,
wherein said using semantic analysis includes using the semantic analysis to determine a relationship between each source object and each target sub-destination, and
wherein said moving includes automatically distributing each source object to a particular target sub-destination based on the semantic analysis.

18. The one or more computing devices of claim 3,
wherein the transient identifier shows a representation of content items associated with the target object, and
wherein the instruction from the user specifies an instruction to move the source object to a particular location within the representation of the content items.

19. The one or more computing devices of claim 1, wherein the semantic-space expression of subject matter associated with the source object is a semantic vector produced by a machine-trained model.

20. The one or more computing devices of claim 1, wherein the semantic-space expression of subject matter associated with the candidate target destination is a semantic vector produced by a machine-trained model.

* * * * *